United States Patent
Takahashi et al.

(10) Patent No.: US 9,792,942 B2
(45) Date of Patent: Oct. 17, 2017

(54) OPTICAL INFORMATION MEDIUM HAVING MULTIPLE LAYERS WITH MANAGEMENT INFORMATION AREAS DISPOSED AT THE SAME DISTANCE FROM CENTER

(71) Applicant: Panasonic Intellectual Property Management Co., Ltd., Osaka (JP)

(72) Inventors: Yoshihisa Takahashi, Osaka (JP); Hisae Kato, Osaka (JP); Motoshi Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/153,101

(22) Filed: May 12, 2016

(65) Prior Publication Data

US 2016/0343394 A1 Nov. 24, 2016

(30) Foreign Application Priority Data

May 18, 2015 (JP) ................................. 2015-100785

(51) Int. Cl.
*G11B 7/24* (2013.01)
*G11B 7/007* (2006.01)

(52) U.S. Cl.
CPC ............ *G11B 7/0079* (2013.01); *G11B 7/007* (2013.01); *G11B 7/00736* (2013.01); *G11B 7/00745* (2013.01); *G11B 2007/00709* (2013.01); *G11B 2007/00754* (2013.01)

(58) Field of Classification Search
None
See application file for complete search history.

(56) References Cited

U.S. PATENT DOCUMENTS

| 5,508,995 A | 4/1996 | Moriya et al. |
| 2003/0137910 A1* | 7/2003 | Ueda ................. G11B 20/1883 369/275.3 |

(Continued)

FOREIGN PATENT DOCUMENTS

| JP | 07-029185 | 1/1995 |
| JP | 2003-323769 | 11/2003 |

(Continued)

*Primary Examiner* — Tan X Dinh
(74) *Attorney, Agent, or Firm* — Wenderoth, Lind & Ponack, L.L.P.

(57) ABSTRACT

A write-once type information recording medium according to one aspect of the present disclosure includes at least one recording layer. In the information recording medium, the at least one recording layer has a spiral shape in which a land track and a groove track are alternately arranged as a recording track, the recording track is divided into blocks each of which being minimum unit in which recording is performed, and the information recording medium includes a management information area where management information is recorded and a user data area where user data is recorded. Each of the management information areas of both the land track and the groove track on each recording layer of the at least one recording layer is disposed at a same distance from the center of the information recording medium.

21 Claims, 22 Drawing Sheets

(56) References Cited

U.S. PATENT DOCUMENTS

| | | | |
|---|---|---|---|
| 2004/0264339 A1* | 12/2004 | Miyagawa | G11B 7/00736 369/275.3 |
| 2005/0030849 A1 | 2/2005 | Park | |
| 2005/0047294 A1 | 3/2005 | Park | |
| 2005/0281164 A1 | 12/2005 | Yoshida et al. | |
| 2006/0195717 A1 | 8/2006 | Ueda et al. | |
| 2006/0239161 A1 | 10/2006 | Takahashi et al. | |
| 2008/0002561 A1* | 1/2008 | Matsumaru | G11B 7/1267 369/275.4 |
| 2008/0002563 A1* | 1/2008 | Yamamoto | G11B 7/00736 369/275.4 |
| 2008/0013440 A1* | 1/2008 | Yamamoto | G11B 7/00736 369/275.4 |
| 2008/0068958 A1 | 3/2008 | Park | |
| 2008/0130443 A1 | 6/2008 | Park | |
| 2010/0020652 A1 | 1/2010 | Park | |
| 2010/0034067 A1 | 2/2010 | Kikukawa et al. | |
| 2010/0074072 A1* | 3/2010 | Kato | G11B 7/00454 369/275.3 |
| 2011/0026391 A1* | 2/2011 | Takahashi | G11B 20/1217 369/275.3 |
| 2017/0040033 A1* | 2/2017 | Takahashi | G11B 20/1217 369/275.3 |

FOREIGN PATENT DOCUMENTS

| | | |
|---|---|---|
| JP | 2005-056542 | 3/2005 |
| JP | 2005-276433 | 10/2005 |
| JP | 2008-243306 | 10/2008 |
| JP | 2009-104772 | 5/2009 |
| JP | 2010-097685 | 4/2010 |

* cited by examiner

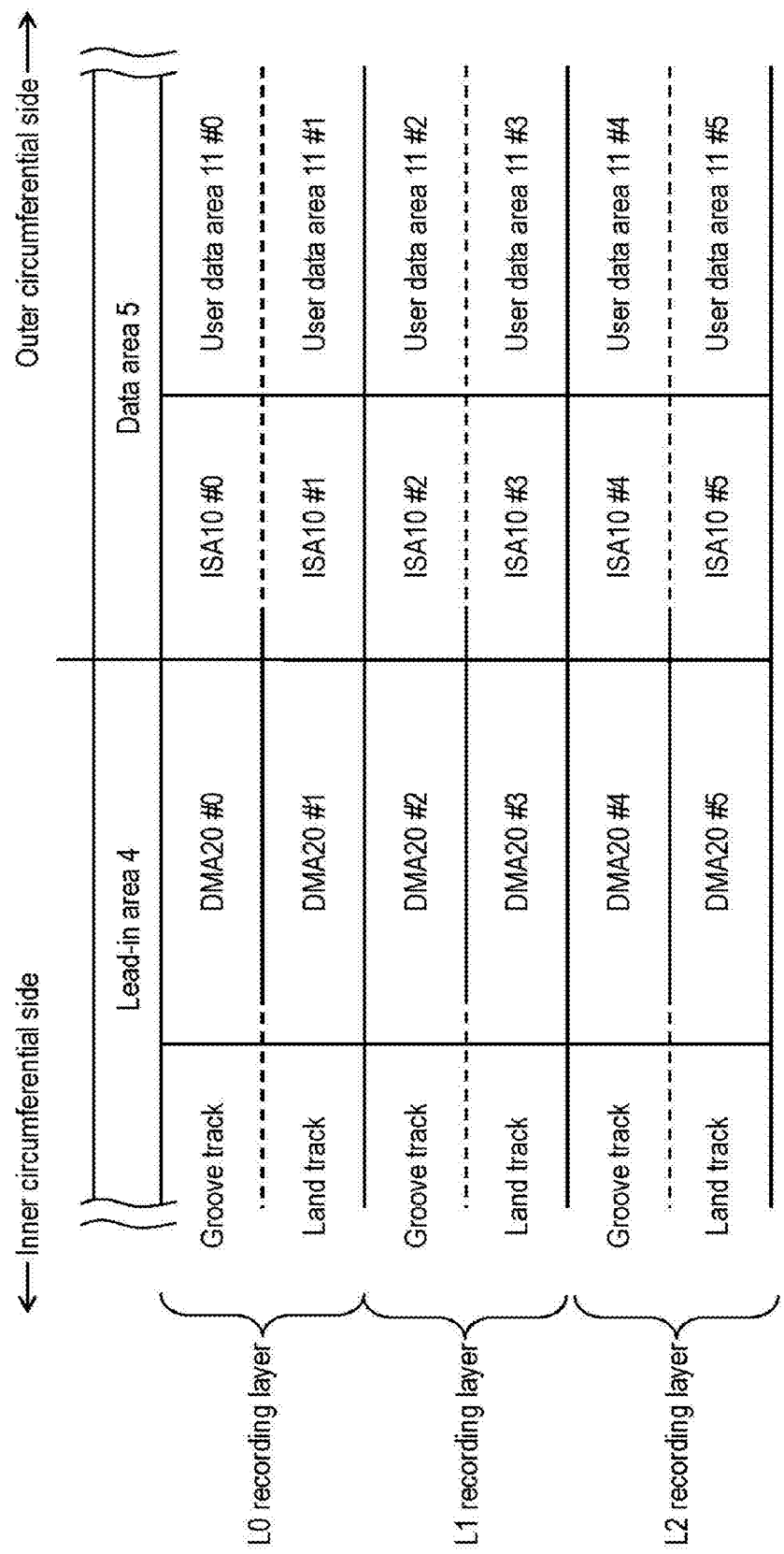

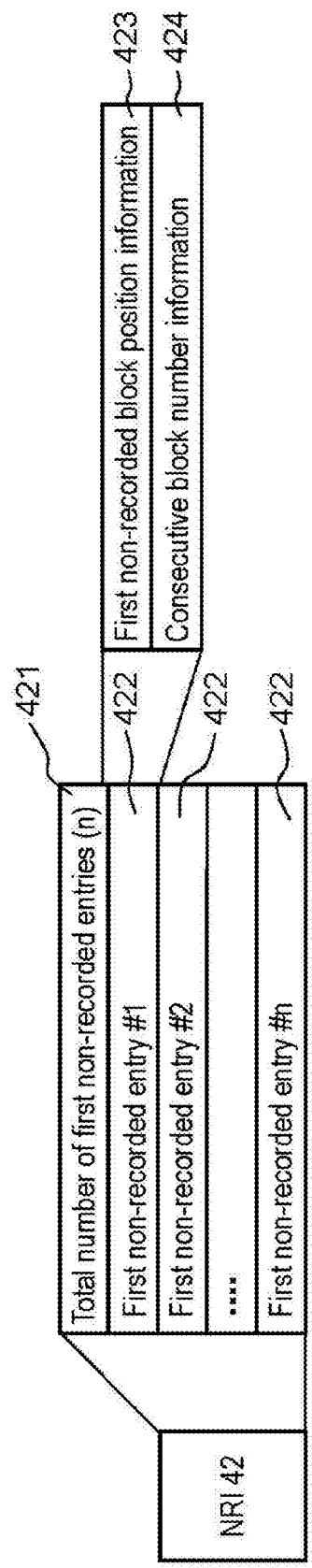

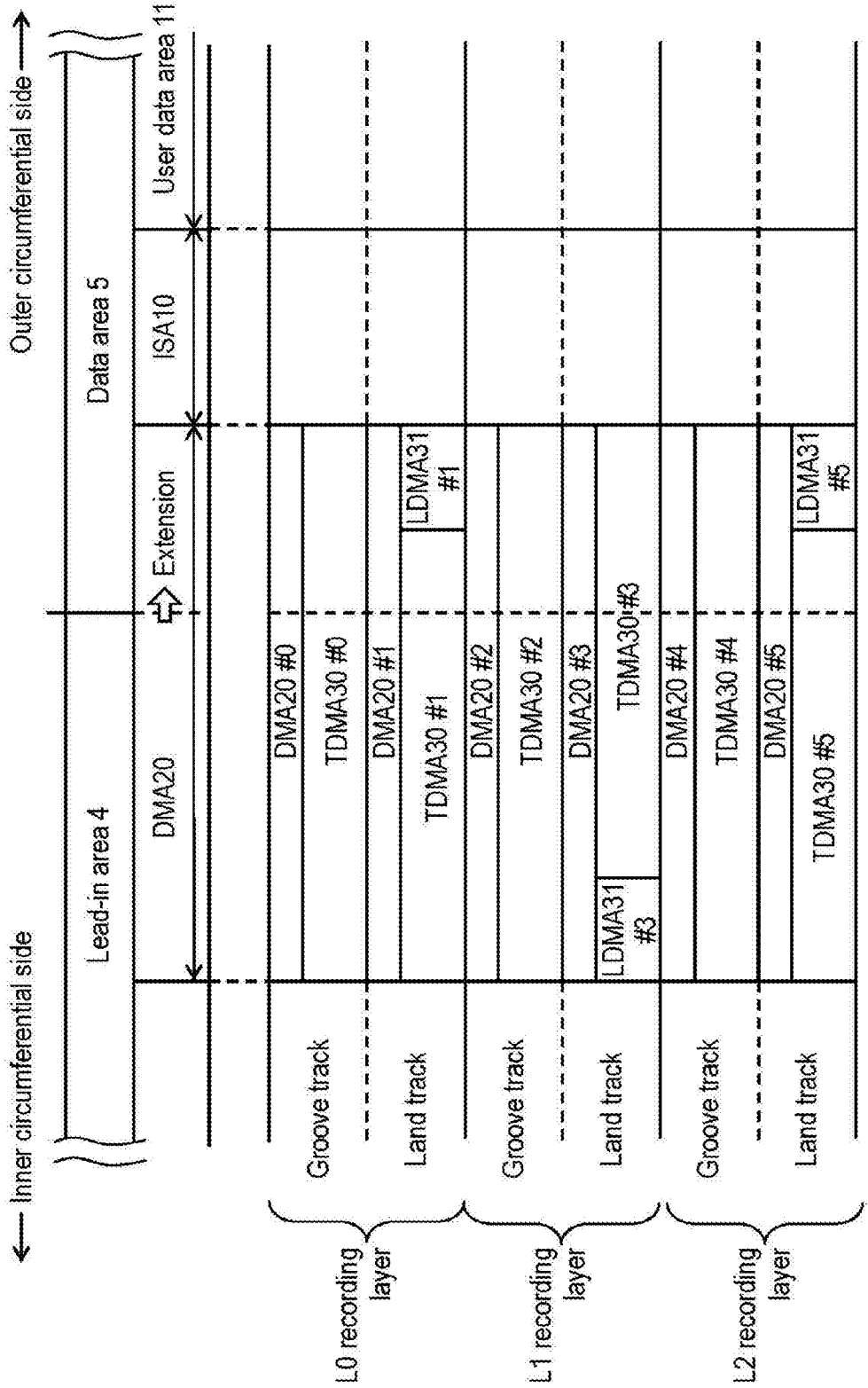

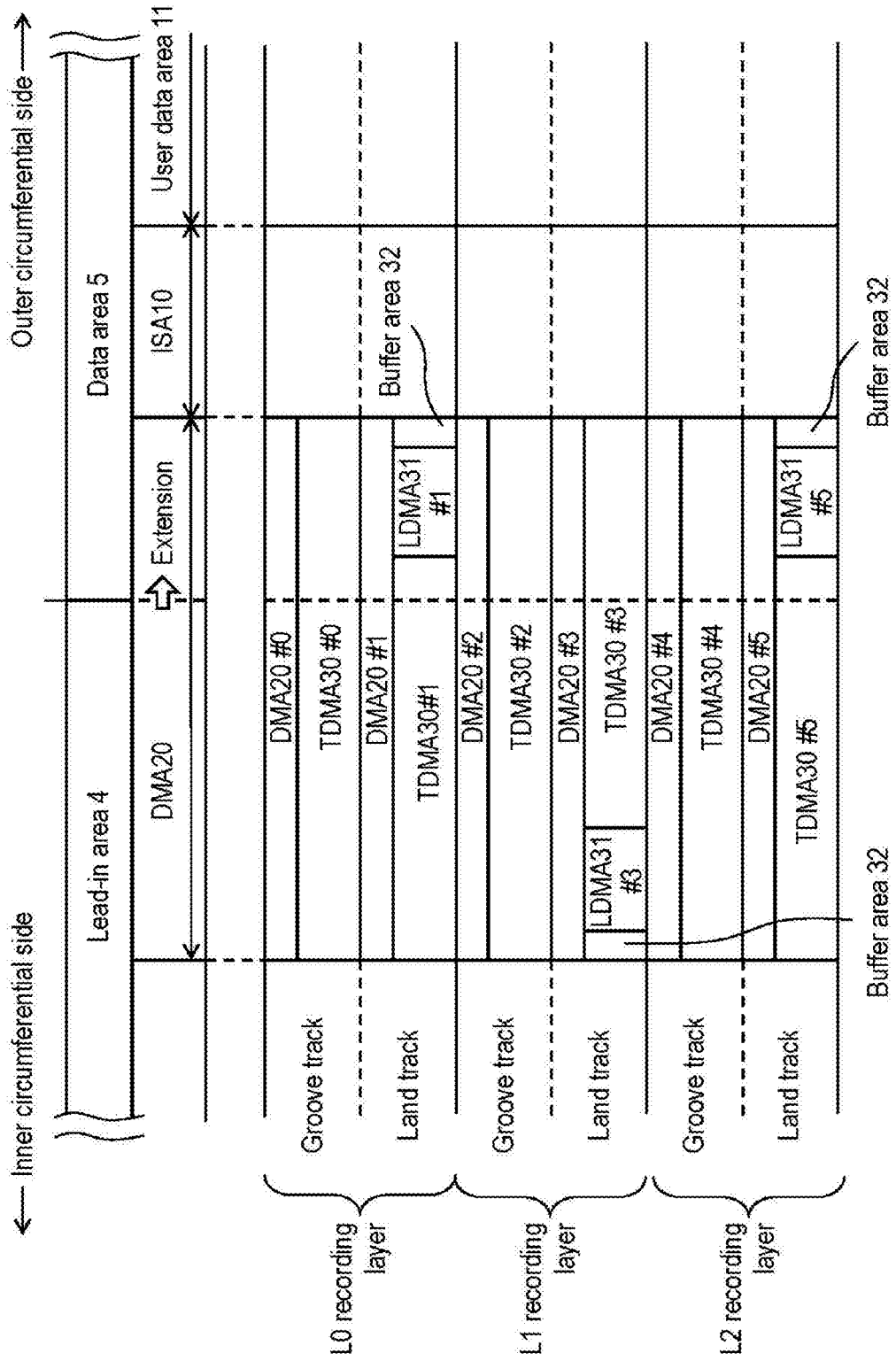

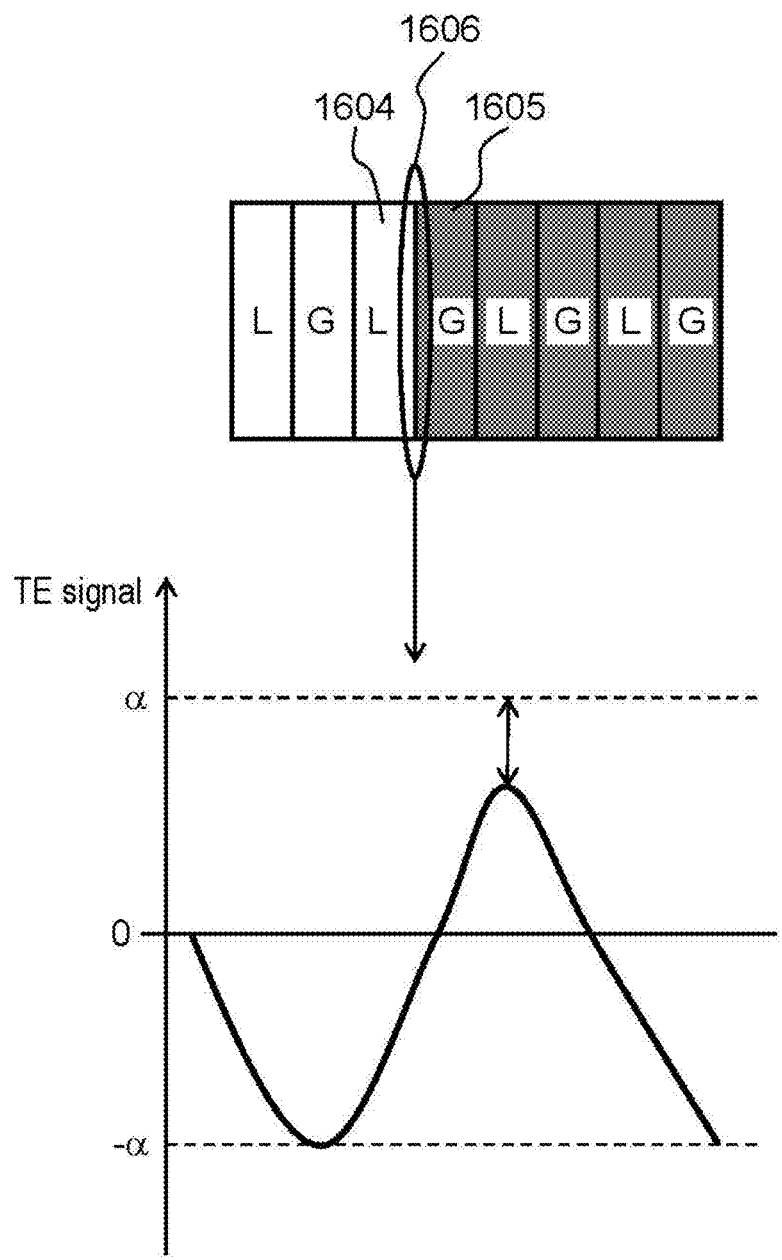

OPTICAL INFORMATION MEDIUM HAVING MULTIPLE LAYERS WITH MANAGEMENT INFORMATION AREAS DISPOSED AT THE SAME DISTANCE FROM CENTER

BACKGROUND

1. Technical Field

The present disclosure relates to an information recording medium, an information recording method, an information recording device, an information playback method, and an information playback device for being able to efficiently ensure and use a management information area necessary to record and play back data in and from an information recording medium including a plurality of information recording surfaces in each of which information is optically recordable in a land and a groove, shortening a time necessary for processing of acquiring or recording management information, and being able to perform recording or playback without being influenced by a transmittance change due to a recording state or a recording state of an adjacent track.

2. Description of the Related Art

Nowadays, various optical discs such as a DVD (Digital Versatile Disc) and a Blu-ray (registered trademark) disc (hereinafter, referred to as a BD) are used as the information recording medium in which a picture or data is stored. Because the optical discs have storage reliability higher than that of a Hard disc Drive (HDD) or a magnetic tape, uses of the optical discs are currently extended from a conventional use of the recording of AV data such as audio and video to long-term storage of the data, namely, a data archive use.

However, the optical disc has a data storage capacity per volume about one third the HDD or magnetic tape. Therefore, from the viewpoint of space efficiency of the optical disc during the storage, there is a demand for technological development of improving the data storage capacity per volume without increasing cost.

Recently, a BDXL having recording density of about 33.4 GB per layer is available as the optical disc having the highest volume recording density in the BD. The BDXL has storage reliability of at least 50 years, and has reliability ten times the HDD having the storage reliability of about 5 years from the viewpoint of long-term data storage. Therefore, the archive data currently stored in the HDD is stored in the optical disc, which allows the long-term storage reliability to be compatible with the storage cost.

From the viewpoint of power consumption, compared with the HDD that consumes power during the data storage, the optical disc does not consume the power during the data storage, but an emission amount of carbon dioxide can be reduced as a green storage considering an earth environment. Nowadays, an increase in power consumption becomes a large problem in a large-scale IT (Information Technology) system such as a data center. The power consumption can be reduced when the optical disc is used as the archive data storage.

In the data center, because of a high requirement for a storage space, there is a demand for further improving the recording density per volume in order to use the optical disc in the archive data storage.

Examples of the technology of improving the recording density per volume of the optical disc include a land-groove recording and playback technology of improving the track recording density and a multi-layer technology including a plurality of recording layers in each of which data is recorded.

The land-groove recording and playback technology is a technology used in a DVD-RAM, and the data recorded in only the land or groove of the optical disc is recorded in both the groove and the lands to improve the track recording density. Usually, when the track recording density of the optical disc is improved, because tracing control is performed on the groove of the track with a light beam, necessary light deflected from the groove decreases, and the track cannot be traced with the light beam.

Assuming that $\lambda$ is a wavelength of a laser beam used as the light beam with which the optical disc is irradiated, and that NA is a numerical aperture of a lens that forms the light beam, a limit gap between the lands or grooves, namely, limit track pitch L is given by as follows.

$$L=(\lambda/NA)\times 0.6$$

When the track pitch is smaller than limit track pitch L, the light deflected from the groove cannot be detected, and the track tracing control cannot be performed. For example, limit track pitch L becomes 650 nm in the DVD having NA of 0.6 and $\lambda$ of 650 nm.

In the DVD-RAM, the data is recorded in both the land and the groove to obtain the track pitch of 615 nm, thereby improving track density (refer to Unexamined Japanese Patent Publication No. 7-29185, for example).

In the multi-layer technology including the plurality of recording layers in each of which the data is recorded, the plurality of recording layers made of a material in which the data is recorded are included in one optical disc (refer to PTL 2: Unexamined Japanese Patent Publication No. 2010-97685, for example). The BD including two recording layers and the BDXL including three or four recording layers are already commercialized as the practical optical disc.

However, when the number of recording layers increases, the light transmittance or reflectance changes due to the recording state, which results in a problem in that it is difficult to ensure recording quality satisfying the long-term data storage reliability.

There is currently performed the technological development of improving the recording density per volume in the optical disc such that the data is recorded in both the land and the groove while the track pitch is further narrowed compared with the BD and the BDXL. According to the technological development, in one side of one optical disc, it is said that the capacity of one layer is larger than or equal to 50 GB, and that the capacity of three layers exceeds 150 GB.

At this point, information about a defect generated on a recording surface by dust or a scratch and management information of information about the recording state on the optical disc are required to perform the recording or playback of the optical disc. Particularly, a write-once type optical disc in which the information can be recorded only once includes a tentative management information area where the management information is transiently updated, and the latest management information is additionally updated in the tentative management information area (refer to Unexamined Japanese Patent Publication No. 2005-56542, for example).

As the recording density of the optical disc increases, a size of the management information increases, and the number of update times of the management information also increases. Therefore, there is a demand for enlarging the size of the area where the management information is tentatively recorded. A method for ensuring the management information area in a lead-in area that a user cannot access is generally adopted as a method for ensuring the large management information area. Additionally, there is a method for separately ensuring the management information area at both ends of data area similarly to a later-described spare area ensured to alternate the defect (refer to Unexamined Japanese Patent Publication No. 2005-276433, for example).

SUMMARY

As described above, the optical disc including the plurality of recording layers becomes common in order to increase the recording density per volume of the optical disc. At the same time, as the number of laminated recording layers increases, it is difficult that, due to the transmittance or reflectance change of the light beam, the data is recorded while the recording quality guaranteeing the storage reliability is ensured. Particularly, in one recording layer, the problem appears remarkably in the case that the data is recorded in both the groove and the land compared with the case that the data is recorded only in the groove or the land.

For the optical disc in which the land-groove recording is performed, it is known that the recording state of the adjacent track influences a Tracking Error (TE) signal with decreasing track pitch of the optical disc. For this reason, when the data is recorded in both the land and groove of the optical disc while the track pitch is narrowed, the influence on the TE signal further increases to adversely influence the track tracing control or the recording quality.

FIG. 16A is a view illustrating a change in offset amount of the TE signal at a non-recorded-non-recorded boundary position in performing the trace control of the track when the recording is performed in the groove and land of a conventional optical disc; and FIG. 16B is a view illustrating the change in offset amount of the TE signal at a recorded-non-recorded boundary position in performing the trace control of the track when the recording is performed in the groove and land of the conventional optical disc.

Referring to FIG. 16A, an amplitude of a waveform of the TE signal obtained at non-recorded-non-recorded boundary position 1603 between tracks 1601 and 1602 that are of the adjacent tracks has symmetry. On the other hand, referring to FIG. 16B, in the amplitude of the waveform of the TE signal obtained at recorded-non-recorded boundary position 1606 between tracks 1604 and 1605 that are of the adjacent tracks, a TE offset amount changes, and the symmetry breaks largely. That is, the symmetry of the amplitude of the TE signal breaks when the recording state of the adjacent track changes.

In the case that the information is recorded in the track of the optical disc, the track tracing control is not optimally performed, and the optimum position cannot be irradiated with the light beam, which result in a risk of degrading recording quality to a level at which the playback cannot be performed. Therefore, it is necessary to satisfy a recording restriction that the recording is not performed in the track at the recorded-non-recorded boundary in FIG. 16B.

An object of the present disclosure is to provide an information recording medium, an information recording method, an information recording device, an information playback method, and an information playback device for ensuring the management information area and other areas at the maximum in consideration of the recording restriction due to the recording state of the adjacent track, and giving a guarantee against the influence of the transmittance or reflectance change during the recording of the management information.

A write-once type information recording medium according to one aspect of the present disclosure includes at least one recording layer. In the information recording medium, the at least one recording layer has a spiral shape in which a land track and a groove track are alternately arranged as a recording track, the recording track is divided into blocks each of which being a minimum unit in which recording is performed, and the at least one recording layer includes a management information area where management information is recorded and a user data area where user data is recorded. Each of the management information areas of both the land track and the groove track on each recording layer of the at least one recording layer is disposed at a same distance from the center of the information recording medium.

Therefore, in the information recording medium including the information recording surface in which the information can optically be recorded in both the land and the groove, the large-capacity data storage being able to be performed by increasing the track density in the information recording medium, the data can correctly be recorded and played back on a proper condition only by performing logical control without decreasing the substantial data capacity usable in the recording, even if the data can incorrectly be recorded because a servo signal can improperly be controlled by the transmittance or reflectance change due to the recording state of another recording layer or the recording state of the adjacent track.

Therefore, the usable data amount can efficiently be ensured as the information recording medium, the reliability can be improved by preventing a data loss, and a frequent retry due to a failure of the recording or playback or performance degradation due to a data alternating processing can be avoided.

Additionally, necessity of an investment of the technological development for the new information recording medium or an investment of the technological development for servo control or signal control of the optical disc drive is eliminated, so that the large-capacity information recording medium and the information recording and playback device can be developed and provided at low cost in a short period of time. Therefore, the large-capacity information recording medium or the information recording and playback device can early be introduced in the archive use in which the data is stored in a long term with high reliability. Additionally, an indirect advantage such as the reduction of power consumption and the reduction of the emission amount of carbon dioxide can also be expected in the data center.

BRIEF DESCRIPTION OF DRAWINGS

FIG. 3 is a view illustrating a land track and a groove track of a recording layer of the optical disc in the exemplary embodiment;

FIG. 4D is a view illustrating an example of a Non-recorded Range Information (NRI) in the exemplary embodiment;

FIG. 6A is a view illustrating a detailed configuration when the DMA of the optical disc of the exemplary embodiment is enlarged;

FIG. 6B is a view illustrating another detailed configuration when the DMA of the optical disc of the exemplary embodiment is enlarged;

FIG. 16B is a view illustrating the change in offset amount of the TE signal at a recorded-non-recorded boundary position in performing the trace control of the track when the recording is performed in the groove and land of the conventional optical disc.

DETAILED DESCRIPTION

Hereinafter, an exemplary embodiment will be described in detail with reference to the drawings. However, the unnecessarily detailed description is occasionally omitted. For example, the detailed description of the well-known item or the overlapping description of the actually identical configuration is occasionally omitted. This is because the following description is prevented from becoming unnecessarily redundant in order that those skilled in the art easily understand the description.

The accompanying drawings and the following description are provided in order to help those skilled in the art to sufficiently understand the present disclosure, but the claims are not limited to the accompanying drawings and the following description.

(Exemplary Embodiment)

An information recording medium, an information recording and playback method, and an information recording and playback device of the exemplary embodiment will be described below with reference to the drawings. The same component is designated by the same reference mark, and the overlapping description is omitted.

In the exemplary embodiment, a write-once type optical disc in which information is recordable once in parts of blocks will be described as an example of the information recording medium, the write-once type optical disc including three recording layers. The write-once type optical disc including three recording layers is described only by way of example, and the similar advantage can also be obtained regardless of the number of recording layers.

(1) Entire Configuration of Optical Disc

Figure 1:
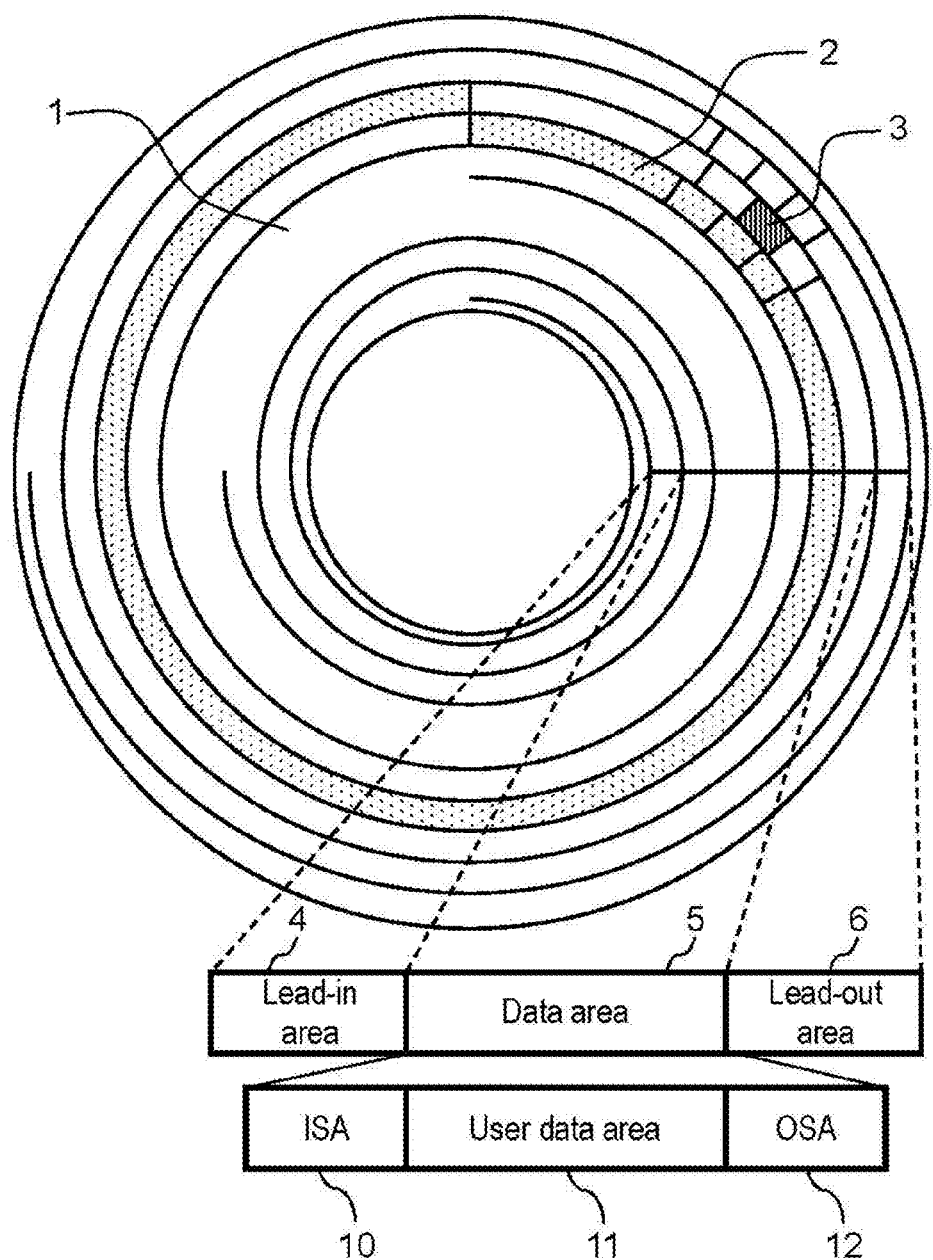
FIG. 1 is a view illustrating an entire configuration of an optical disc according to an exemplary embodiment.

FIG. 1 is a view illustrating an entire configuration of an optical disc of the exemplary embodiment. Referring to FIG. 1, optical disc 1 includes at least one recording layer in which the information can be recorded and played back. Many spiral tracks 2 are formed in the recording layer. Many blocks 3 finely dividing track 2 are formed in track 2. Address information (hereinafter, referred to as a physical address) indicating a physical position on the disc is provided to track 2 by wobbling the groove.

For example, a track pitch that is of a width of track 2 is 0.32 μm in the BD. Block 3 is an error correction unit, and is a minimum unit in which the recording and playback operations are performed. For example, for the DVD, 1 block is 1 ECC (Error Correction Code), and a size is 32K bytes. For BD, 1 block is 1 cluster, and a size is 64K bytes. When a unit called a sector having the 2K-byte size that is of the minimum unit of the optical disc data is used, 1 ECC is 16 sectors, and 1 cluster is 32 sectors.

Optical disc 1 is roughly divided into lead-in area 4, data area 5, and lead-out area 6. Sometimes lead-in area 4 is called an inner area and lead-out area 6 is called an outer area. Data area 5 includes user data area 11, Inner Spare Area (ISA) 10, and Outer Spare Area (OSA) 12. User data is recorded in user data area 11. ISA 10 and OSA 12 are spare areas each of which includes an alternation area used in alternative recording of a defect area detected in user data area 11. Hereinafter, the term "spare area" indicates both ISA 10 and OSA 12.

Each of lead-in area 4 and lead-out area 6 includes an area in which management information necessary for the recording or playback of optical disc 1 is recorded. Lead-in area 4 and lead-out area 6 also act as a margin such that an optical pickup of an optical disc drive can follow track 2 even in an overrun in the case that the optical pickup accesses an end of data area 5.

Lead-in area 4 and lead-out area 6 are areas where a user can directly perform neither the recording nor the playback.

Figure 2:
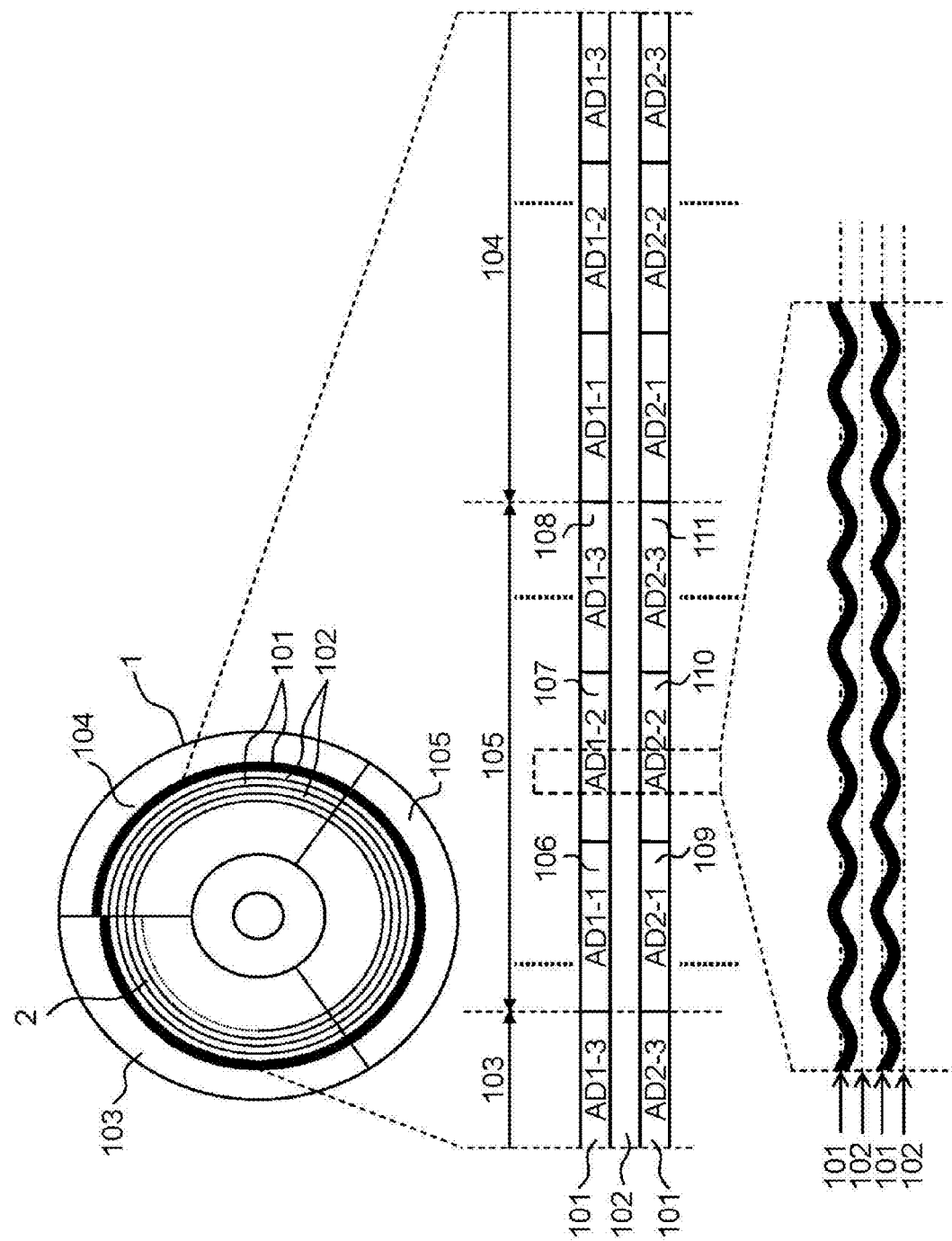
FIG. 2 is a view illustrating a detailed configuration of a track of an optical disc in the exemplary embodiment.

FIG. 2 is a view illustrating a detailed configuration of track 2 of optical disc 1 in the exemplary embodiment. Referring to FIG. 2, in track 2 of optical disc 1, groove track 101 of a groove portion and land track 102 of an inter-groove portion are alternately repeated. Track 2 is radially divided into three to form address groups 103, 104, and 105. In address group 105, three independent physical addresses 106, 107, and 108 are recorded in one groove track 101 by wobbling the groove, and three independent physical addresses 109, 110, and 111 different from physical addresses 106, 107, and 108 are recorded in the other groove track 101 by wobbling the groove. An address value is sequentially increased in a set of physical addresses 106, 107, and 108 and a set of physical addresses 109, 110, and 111. Address groups 103 and 104 have a structure similar to that of address group 105.

Because the physical address is recorded by wobbling the groove, groove track 101 and land track 102, which are adjacent to the wobble, are managed by the same physical address. In groove track 101 and land track 102, the physical address recorded by the wobbling is sequentially provided toward a predetermined direction, for example, from an inner circumferential side toward an outer circumferential side in a radial direction of optical disc 1. In optical disc 1, because of the access to recording areas of recording tracks formed by groove track 101 and land track 102, the data can be recorded in the same area while multiplexed in the physical address recorded by wobbling the provided groove.

A lower stage of FIG. 2 is a partially enlarged view illustrating physical addresses 107 and 110 of track 2. In optical disc 1, wobbling phases of groove tracks 101 adjacent to each other are matched with each other. This is because a length of one round of track 2 in optical disc 1 is configured so as to be an integral multiple of a wobble period. Therefore, the width of land track 102 sandwiched between two groove tracks 101 is kept constant.

The direct access to optical disc 1 is performed using the physical address recorded by the wobble after servo of an information recording device is traced onto a side of desired groove track 101 or land track 102. Address information included in management information or information used in control software for an information recording and playback device is recorded in optical disc 1 using a virtual physical address in which information indicating the groove track or land track is further provided to the physical address formed by the wobble.

(2) Configuration of Area in Optical Disc

FIG. 3 is a view illustrating the land track and the groove track of the recording layer of the optical disc in the exemplary embodiment. "#" in FIG. 3 indicates a serial number, the groove track of the L0 recording layer has the serial number of #0, the land track of the L0 recording layer has the serial number of #1, the groove track of the L1 recording layer has the serial number of #2, the land track of the L1 recording layer has the serial number of #3, the groove track of the L2 recording layer has the serial number of #4, and the land track of the L2 recording layer has the serial number of #5.

As described above, data area 5 includes user data area 11, ISA 10, and OSA 12. User data is recorded in user data area 11. ISA 10 and OSA 12 are the spare areas each of which includes the alternation area used in the alternative recording of the defect area detected in user data area 11. As illustrated in FIG. 3, ISA 10, user data area 11, and OSA 12 (not illustrated) are disposed in all the recording layers of optical disc 1, namely, at the same radial position of the land tracks and groove tracks of the L0 recording layer, L1 recording layer, and L2 recording layer.

Lead-in area 4 is a management information area disposed on the inner circumferential side in a predetermined recording layer of optical disc 1. Lead-in area 4 includes Disc Management Area (DMA) 20 that is of an area where the management information indicating a recording state of optical disc 1 is recorded in addition to a servo adjusting area (not illustrated) and a recording power adjusting area (not illustrated).

DMA 20 is disposed in all the recording layers of optical disc 1, namely, at the same radial position of the land tracks and groove tracks of the L0 recording layer, L1 recording layer, and L2 recording layer. In each recording layer of optical disc 1, DMA 20 is disposed only in one place, but not disposed in a plurality of places in the radial direction. DMA 20 is always disposed in lead-in area 4 at a boundary with data area 5.

Specifically, as illustrated in FIG. 3, in DMA 20, DMA 20 #0 is disposed in the groove track of the L0 recording layer, DMA 20 #1 is disposed in the land track of the L0 recording layer, DMA 20 #2 is disposed in the groove track of the L1 recording layer, DMA 20 #3 is disposed in the land track of the L1 recording layer, DMA 20 #4 is disposed in the groove track of the L2 recording layer, and DMA 20 #5 is disposed in the land track of the L2 recording layer. DMA 20 is used in the order of DMA 20 #1, DMA 20 #2, DMA 20 #3, DMA 20 #4, and DMA 20 #5. A surface of optical disc 1 is an L2 recording layer side, and optical disc 1 is irradiated from the L2 recording layer side with a laser beam to record or play back the data. Accordingly, DMA 20 is sequentially used from a deepest side toward a front side with respect to the surface of optical disc 1. The reason DMA 20 is used in the above order is that the recording layer in which DMA 20 is recorded is not influenced by a transmittance or reflectance change generated by the recording state of the recording layer disposed on the front side. The recording layer on the front side of the recording layer in which DMA 20 is recorded is not recorded in recording DMA 20 in any recording layer, so that DMA 20 can be recorded while the influence of the recording state of the recording layer on the front side of the recording layer is suppressed.

The reason the use order of DMA 20 can be defined is that DMA 20 is the management information area. The optical disc drive controls the recording of DMA 20, so that the use order of DMA 20 can be defined with respect to the optical disc drive.

The use order of user data area 11 cannot be defined unlike DMA 20. In user data area 11, the user records the user data from any position in any timing. For example, the user can also record the user data from the L2 recording layer on a surface side of optical disc 1. For this reason, the optical disc drive cannot control the recording position of the user data.

An unrecordable area, such as a buffer area that is located between DMA 20 and an adjacent area to reduce the influence of the recording state or a recording state buffering area that is located between the recording layers in consideration of an eccentric error or a laminating error, can be minimized by disposing DMA 20 at the same radial position in all the recording layers.

Processing of acquiring the latest management information about optical disc 1 can be performed only at a restricted radial position of optical disc 1 by radially defining the layout of DMA 20 in one place in each recording layer, which allows minimization of a seek distance of the optical pickup. Therefore a time necessary for the latest management information acquisition processing can be shortened.

Figure 4A:
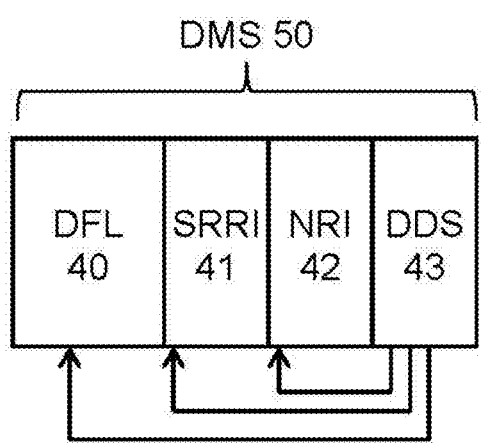
FIG. 4A is a view illustrating an example of a Disc Management Structure (DMS) in the exemplary embodiment.

The configuration of DMA 20 will be described in detail below. FIG. 4A is a view illustrating an example of a Disc Management Structure (DMS) of the exemplary embodiment, FIG. 4B is a view illustrating an example of a Sequential Recording Range Information (SRRI), FIG. 4C is a view illustrating an example of a DeFect List (DFL), FIG. 4D is a view illustrating an example of a Non-recorded Range Information (NRI), and FIG. 4E is a view illustrating an example of a Disc Definition Structure (DDS).

DMA 20 is an area where the DMS is recorded. As illustrated in FIG. 4A, DMS 50 is constructed with the pieces of management information such as Disc Definition Structure (DDS) 43, DeFect List (DFL) 40, Sequential Recording Range Information (SRRI) 41, and Non-recorded Range Information (NRI) 42. DDS 43 includes information about the layouts and sizes of ISA 10 and OSA 12 that are of the spare areas of optical disc 1 and information about a recording mode. DFL 40 includes information about the virtual physical address associated with a defect block or an alternation block. SRRI 41 is used to manage the recording state of a Sequential Recording Range (SRR) in user data area 11. NRI 42 is used to manage non-recorded blocks such as a defect block including a non-recorded portion such as lead-in area 4 and a block that pretends to be used although actually not used.

Figure 4B:
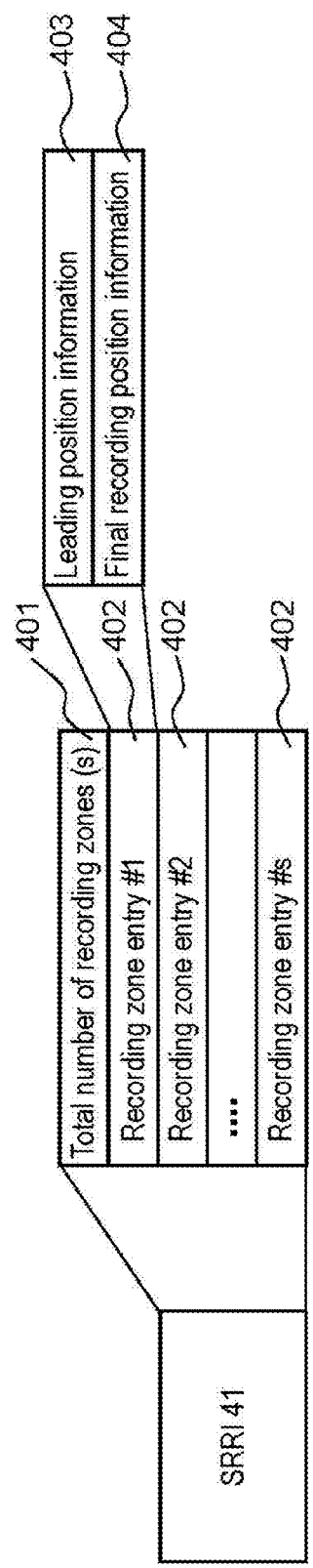
FIG. 4B is a view illustrating an example of a Sequential Recording Range Information (SRRI) in the exemplary embodiment.
Figure 4C:
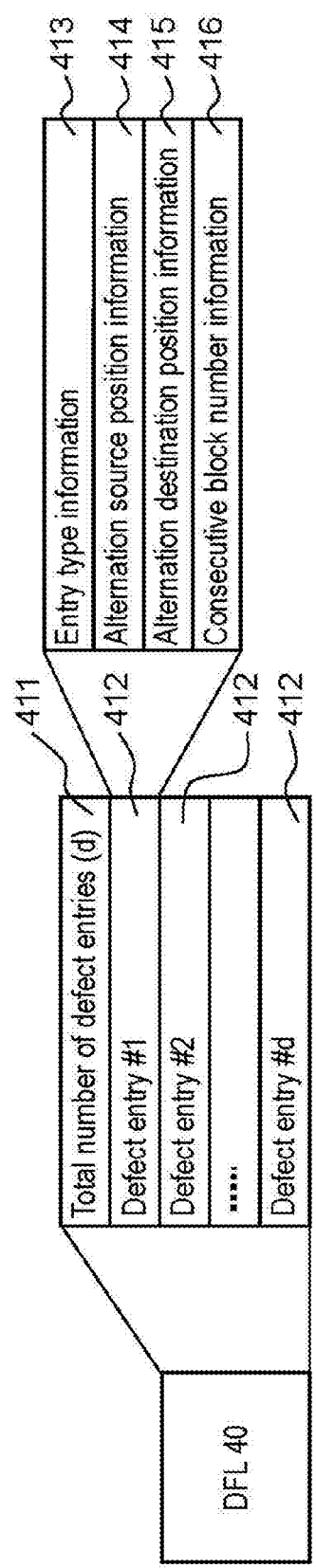
FIG. 4C is a view illustrating an example of a DeFect List (DFL) in the exemplary embodiment.
Figure 4E:
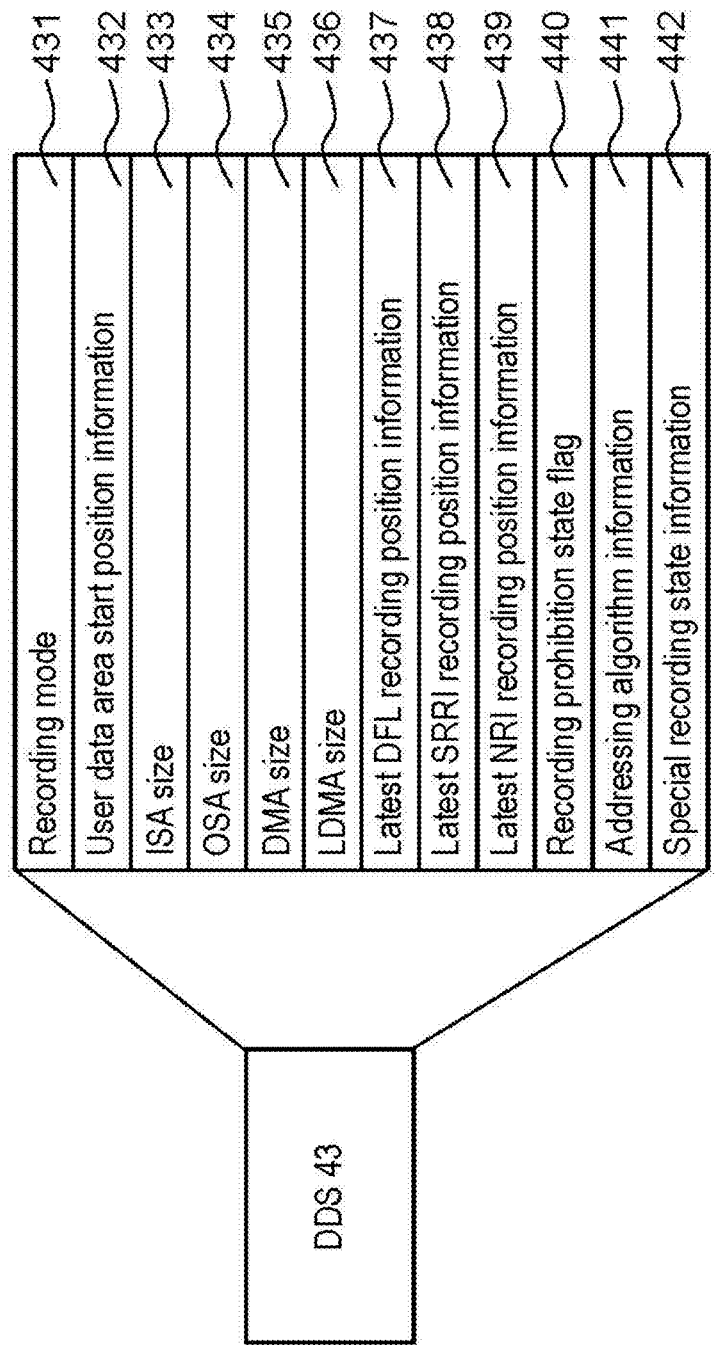
FIG. 4E is a view illustrating an example of a Disc Definition Structure (DDS) in the exemplary embodiment.

Referring to FIG. 4B, SRRI 41 includes recording zone entry 402 of information about a recording zone called the SRR that is of a recording range where the write-once recording is performed and a total number of recording zones 401 that is of the number of recording zone entries 402. Recording zone entries 402 #1 to #s, namely, sum total s (s is an integer of 1 or more) of recording zone entries 402 exist in SRRI 41.

In the case that the user does not set the consecutive recording area, whole user data area 11 becomes one recording zone, the total number of recording zone of SRRI 41 is one, and recording zone entry 402 becomes recording zone entry #1.

Recording zone entry 402 includes leading position information 403 that is of information about a leading position of the recording zone and final recording position information 404 indicating a final position at which the user data is recorded in the recording zone.

Referring to FIG. 4C, DFL 40 includes defect entry 412 that is of information about the defect block or the alternation block of which a Pseudo OverWrite (POW) instruction is received and a total number of defect entries 411 that is of the number of defect entries 412. Defect entries #1 to #d, namely, sum total d (d is an integer of 0 or more) of defect entries 412 exist in DFL 40.

In the case that the defect block or the alternation block does not exist, the total number of defect entries 411 of DFL 40 becomes zero, but defect entry 412 does not exist.

As used herein, the POW means that, in the write-once type optical disc in which the recording can be performed only once, the data is alternately recorded in user data area 11 or ISA 10 and OSA 12 that are of the spare areas in response to a request to perform the recording in a recorded area, and the data of an alternation destination is read by registering an entry associated with the alternation in DFL 40 as defect entry 412, whereby it seem that the overwrite is performed on the recorded area.

Defect entry 412 includes entry type information 413, alternation source position information 414, alternation destination position information 415, and consecutive block number information 416. Alternation source position information 414 and alternation destination position information 415 are virtual physical addresses. Entry type information 413 is identification information indicating whether the block indicated by alternation source position information 414 is a "non-recorded defect block" including the non-recorded portion. In the exemplary embodiment, the non-recorded defect block except for user data area 11 is managed using NRI 42, and it is assumed that the non-recorded defect block in user data area 11 is managed using DFL 40.

However, the same advantage can be obtained even if all the non-recorded defect blocks on optical disc 1 are managed using NRI 42.

Entry type information 413 may further include identification information indicating whether the alternation destination block is allocated to the block becoming the alternation source of the defect block indicated by defect entry 412 and identification information indicating the block in which the effective user data is recorded.

Alternation source position information 414 indicates an original position of the block, such as the defect block, which becomes an alternation source. Alternation destination position information 415 indicates a position of the alternation block that is of the alternation destination of the defect block. Consecutive block number information 416 indicates the number of consecutive blocks of the defect block and alternation block in the case that the defect block and alternation block are consecutive.

Referring to FIG. 4D, NRI 42 is the management information managing the information about the area that exists in lead-in area 4 while remaining in the non-recorded state. More specifically, in at least the area except for the user data area 11 managed by DFL 40, NRI 42 is the management information managing the information about the non-recorded defect block, which becomes the completely non-recorded state or the partially non-recorded state in block 3 where the recording is unsuccessfully performed, or the block remaining in the non-recorded state. NRI 42 is the information necessary to provide such the recording restriction that the recording is not performed in track 2 in which the adjacent track has the different recording state as illustrated in FIG. 16B. NRI 42 includes first non-recorded entry 422 indicating a first non-recorded area that is of the information about the non-recorded defect block or the block that is not used in the non-recorded state and the total number of first non-recorded entries 421 that is of the number of first non-recorded entries 422. First non-recorded entries 422 #1 to #s, namely, sum total n (n is an integer of 0 or more) of first non-recorded entries 402 exist in NRI 42. As described above, the first non-recorded area means the defect block that partially becomes the non-recorded state unlike the area in the non-recorded state, in which the recording is not performed yet but performed in future, or the area that is dealt with as if it is used in the recording although the recording is not actually performed. Hereinafter, the first non-recorded area indicates the area, and the simple non-recorded area indicates the whole area, where the recording is not performed yet, including the first non-recorded area.

In the case that the first non-recorded area does not exist, the total number of first non-recorded entries 421 of NRI 42 becomes zero, but first non-recorded entry 422 does not exist.

First non-recorded entry 422 includes first non-recorded block position information 423 and consecutive block number information 424. First non-recorded entry 422 has the basically same configuration as defect entry 412 except that first non-recorded entry 422 does not partially include information.

First non-recorded block position information 423 indicates an original position of the leading block of the first non-recorded area. Consecutive block number information 424 indicates the number of consecutive blocks in the case that the first non-recorded area including the non-recorded blocks such as the unused block (usable block) includes a plurality of blocks.

Referring to FIG. 4E, DDS 43 includes recording mode 431, user data area size 432, ISA size 433, OSA size 434, DMA size 435, LDMA size 436, latest DFL recording position information 437, latest SRRI recording position information 438, latest NRI recording position information 439, recording prohibition state flag 440, addressing algorithm information 441, and special recording state information 442.

Additionally, DDS 43 may include position information indicating the position where the next recording can be performed in ISA 10 and OSA 12 of the spare areas.

Recording mode 431 is information indicating whether optical disc 1 is in a logical overwrite recording mode or a consecutive recording mode. User data area size 432 is information about the size of user data area 11. ISA size 433 is information about the size of ISA 10. OSA size 434 is information about the size of OSA 12.

DMA size 435 is information about the size of DMA 20. Because the position on the inner circumferential side of DMA 20 is a fixed position, a layout position (inner-circumferential-side position) of ISA 10 can be confirmed using the information about DMA size 435.

LDMA size 436 is information about the size of the LDMA. LDMA size 436 is always smaller than DMA size 435.

Latest DFL recording position information 437 is information indicating the position where DFL 40 of latest DMS 50 is recorded. Latest SRRI recording position information 438 is information indicating the position where SRRI 41 of latest DMS 50 is recorded. Latest NRI recording position information 439 is information indicating the position where NRI 42 of latest DMS 50 is recorded.

Recording prohibition state flag 440 is information including a flag indicating whether optical disc 1 is in the recording prohibition state. Specifically, recording prohibition state flag 440 includes a flag indicating that the recording in data area 5 is prohibited and a flag indicating that optical disc 1 is finalized not to be able to perform the recording in optical disc 1 including lead-in area 4.

In the case that recording prohibition state flag 440 indicates a finalized state, optical disc 1 is in the finalized state, but the recording cannot be performed any more in optical disc 1 including lead-in area 4 and data area 5. Addressing algorithm information 441 is information indicating which rule is used to allocate a Logical Block Address (LBA) used in the user access through a high-order control device (not illustrated) onto optical disc 1.

Special recording state information 442 is information indicating a recording method whether the recording is performed in user data area 11, ISA 10, and OSA 12 of data area 5 in the order from the L0 recording layer on the deep side when optical disc 1 is viewed from the surface similarly to DMA 20 using a special technique in consideration of the transmittance or reflectance change due to the difference of the recording state.

DDS 43 may include information indicating the next usable position in each of the groove track and land track as, for example, information indicating the next usable position in ISA 10 and OSA 12 of the spare areas.

An orientation in which each recording layer of optical disc 1 is used will be described below. The L0 recording layer and the L2 recording layer are recording layers that are used in a forward spiral manner from the inner circumferential side toward the outer circumferential side. The L1 recording layer is a recording layer that is used in a reverse spiral manner from the outer circumferential side toward the inner circumferential side. This is the orientation in which the physical address indicating the actual position on optical disc 1 is provided. The data is recorded in the reverse spiral manner with respect to at least DAM 20 and user data area 11. On the other hand, the data is not necessarily recorded in the reverse spiral manner with respect to ISA 10 and OSA 12 of the spare areas and an Optimum Power Control (OPC) area of a recording learning area.

Figure 5:
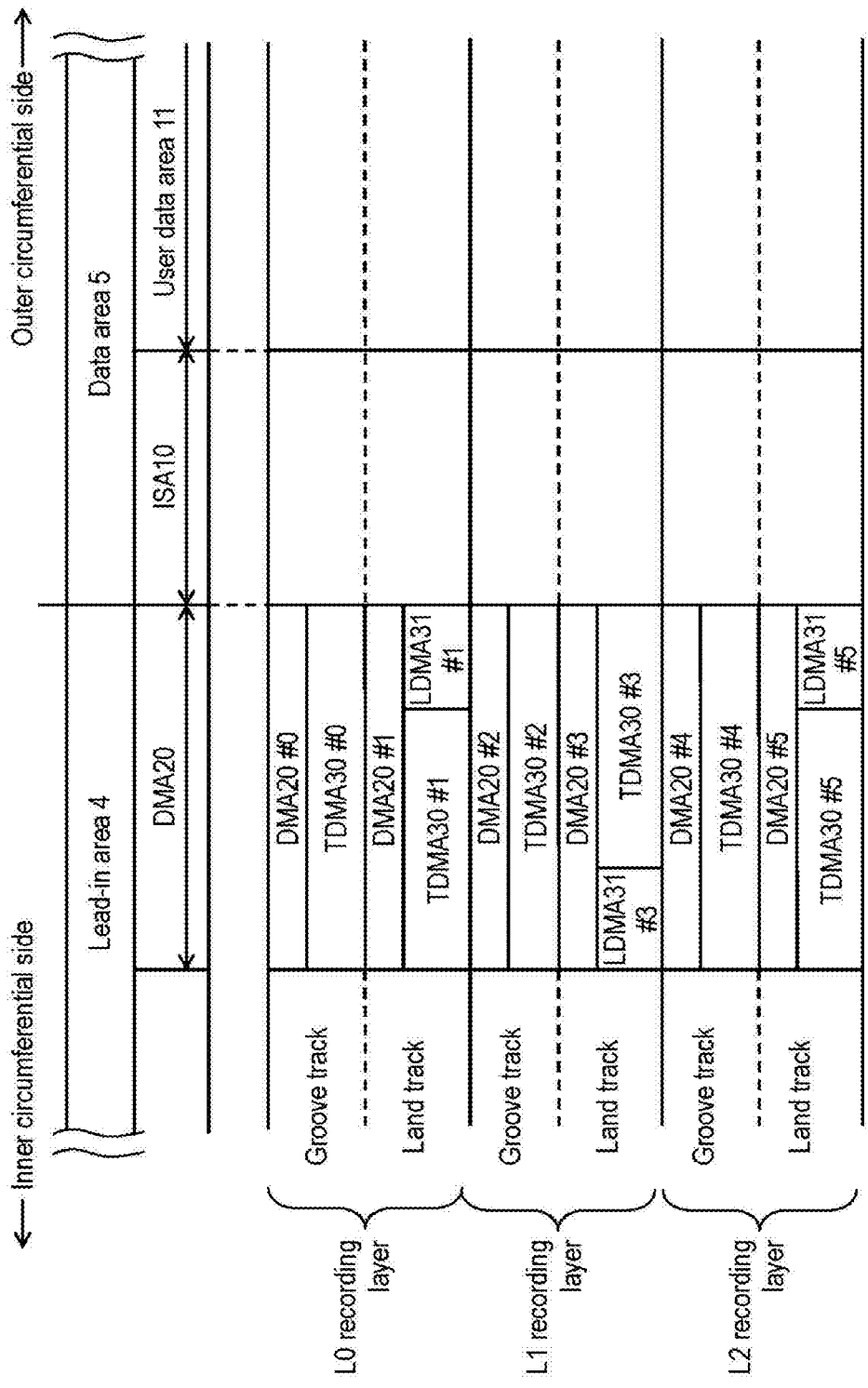
FIG. 5 is a view illustrating an example of a detailed configuration of a Disc Management Area (DMA) of the optical disc in the exemplary embodiment.

DMA 20 is roughly constructed with two areas. FIG. 5 is a view illustrating an example of a detailed configuration of DMA 20 of optical disc 1 in the exemplary embodiment. DMA 20 includes TDMA (Temporary Disc Management Area) 30 and LDMA (Layer-latest Disc Management Area) 31.

TDMA 30 is a temporary management information area where DMS 50 is transiently recorded. More specifically, in write-once type optical disc 1, DMS 50 recorded once cannot be updated by the overwrite. For this reason, DMS 50 is sequentially and temporarily recorded in a predetermined direction of TDMA 30, for example, from the inner circumferential side toward the outer circumferential side in the L0 recording layer.

The management information is temporarily recorded in TDMA 30, and only the management information that needs to be updated is recorded and updated in each recording. In other words, the management information in which the state or content is not changed needs not to be recorded in TDMA 30 even if another piece of management information needs to be updated in TDMA 30. Therefore, TDMA 30 having the restricted size can effectively be used.

DMS 50 recorded in TDMA 30 is recorded while DDS 43 is always provided to the final position. This is because DDS 43 includes the information indicating the position where the latest management information is recorded. DDS 43 included in DMS 50 existing at a boundary position between the recorded area and the unused and non-recorded area in TDMA 30 is latest DDS 43, and the management information existing at the position indicated by DDS 43 is the management information constituting latest DMS 50.

LDMA 31 is confirmed management information area collectively recording all the pieces of management information constituting latest DMS 50 in each recording layer, and one LDMA 31 is disposed in each recording layer. The term "the data is recorded in LDMA 31" indicates that the use of TDMA 30 included in the corresponding recording layer is completed. The term "the use of TDMA 30 is completed" includes the case that TDMA 30 in the corresponding recording layer is not used any more although the usable area (unused area) remains in addition to the case that the recording cannot be performed any more because all the areas included in TDMA 30 are used.

As described above, because only the management information that needs to be recorded is updated in TDMA 30, all the pieces of management information constituting latest DMS 50 are not recorded at proximity positions. On the other hand, the recording is performed such that all the pieces of management information constituting latest DMS 50 is disposed in LDMA 31. Therefore, the latest management information in each recording layer is disposed in the restricted area of LDMA 31, so that the management information can be searched more efficiently in a shorter time in processing of searching the latest management information.

Similarly to TDMA 30, the recording is performed in LDMA 31 such that latest DDS 43 is always disposed at a final recording position, namely, in a final sector of a final recording block of LDMA 31.

As illustrated in FIG. 5, LDMA 31 is disposed at a predetermined position of DMA 20 in each recording layer, namely, a terminal position of DMA 20. As used herein, the terminal position means a position that is finally used.

In optical disc 1, the L0 recording layer and the L2 recording layer are sequentially used from the inner circumferential side toward the outer circumferential side, and the L1 recording layer is sequentially used from the outer circumferential side toward the inner circumferential side.

LDMA 31 #1 disposed in the L0 recording layer and the LDMA 31#5 disposed in the L2 recording layer are disposed at positions on the outermost circumferential side in DMA 20. LDMA 31 #3 disposed in the L1 recording layer is disposed at the position on the innermost circumferential side of DMA 20.

As illustrated in FIG. 5, LDMA 31 is always disposed on all the land tracks in the recording layer. Specifically, LDMA 31 #1 is disposed in the land track of the L0 recording layer, LDMA 31 #3 is disposed in the land track of the L1 recording layer, and LDMA 31 #5 is disposed in the land track of the L2 recording layer.

LDMA 31 may be included in not only the land tracks but also the groove tracks in all the recording layers.

Accordingly, DMA 20 is used in the order of TDMA 30 #0→TDMA 30 #1→LDMA 31 #1→TDMA 30 #2→TDMA 30 #3→LDMA 31 #3→TDMA 30 #4→TDMA 30 #5→LDMA 31 #5.

At this point, in only LDMA 31 #5 disposed in the L2 recording layer, all the pieces of management information constituting latest DMS 50 in the L2 recording layer are collectively recorded, and all the pieces of management information constituting latest DMS 50 in optical disc 1 are collectively recorded. For example, optical disc 1 is put into a read-only disc in which the recording cannot be performed any more, that is, all the pieces of management information constituting latest DMS 50 in optical disc 1 are recorded in LDMA 31 #5 irrespective of the use state of TDMA 30 at a time point at which finalize request to prohibit the additional recording is received.

For example, a default size of DMA 20 is 128 blocks. The size of LDMA 31 is greater than or equal to a maximum size of DMS 50, for example, 18 blocks. However, the number of update times of TDMA 30 included in DMA 20 depends on a design specification or a processing specification of the optical disc drive. For LDAM 31, the number of update times also depends on the design specification or processing specification of the optical disc drive such that a margin for a local defect is provided or such that multiple recording is performed. Therefore, the large area size of DMA 20 can be ensured in order to meet these demands.

FIG. 6A is a view illustrating a detailed configuration when DMA 20 of optical disc 1 of the exemplary embodiment is enlarged. In lead-in area 4, the servo adjusting area and the recording power adjusting area are ensured in addition to DMA 20. For example, the lead-in area 4 is restricted to a radius of 24 mm from an inner circumference, the usable area size is also restricted.

In order to largely ensure the size of DMA 20, the position on the inner circumferential side of DMA 20 is kept at the fixed position, and DMA 20 disposed at the boundary with data area 5 is extended toward the side of data area 5 in lead-in area 4. That is, DMA 20 is disposed across lead-in area 4 and data area 5. Therefore, the size of DMA 20 can be enlarged while DAM 20 is disposed only in one place in the radial direction.

When DMA 20 is extended toward the side of data area 5, the layout positions of ISA 10 and user data area 11 that are disposed in data area 5 deviate onto the outer circumferential side.

For example, DDS 43 includes information about the size of DMA 20, information about a start end of ISA 10, and information about the size of LDMA 31.

In optical disc 1 of the exemplary embodiment, the recording cannot be performed in track 2 in which the recording state of the adjacent track varies. For example, in the case that target track 2 is the land track, the recording cannot be performed when both the groove tracks adjacent to the land track are non-recorded or recorded. In order to satisfy the condition, the buffer area where the influence of the recording state of the adjacent area needs to be provided in at least one of the land track and the groove track between lead-in area 4 and data area 5, for example, between DMA 20 and ISA 10, between OSA 12 of data area 5 and lead-out area 6, or between ISA 10 or OSA 12 and user data area 11.

FIG. 6B is a view illustrating another detailed configuration when DMA 20 of optical disc 1 of the exemplary embodiment is enlarged. As illustrated in FIG. 6B, buffer area 32 is provided between DMA 20 and ISA 10 in the land tracks of the L0 recording layer and L2 recording layer and at a position on the innermost circumferential side of DMA 20 in the land track of the L1 recording layer. Buffer area 32 is an area in the non-recorded state in which the data is not recorded. The size of buffer area 32 is greater than or equal to one track size. For example, the size of buffer area 32 is greater than or equal to 4 blocks because buffer area 32 is track 2 on the inner circumferential side.

In the case of FIG. 5, it is also necessary to provide buffer area 32. However, the description is omitted.

The buffer area may be ensured at the leading position or leading position of ISA 10 or OSA 12.

Figure 7:
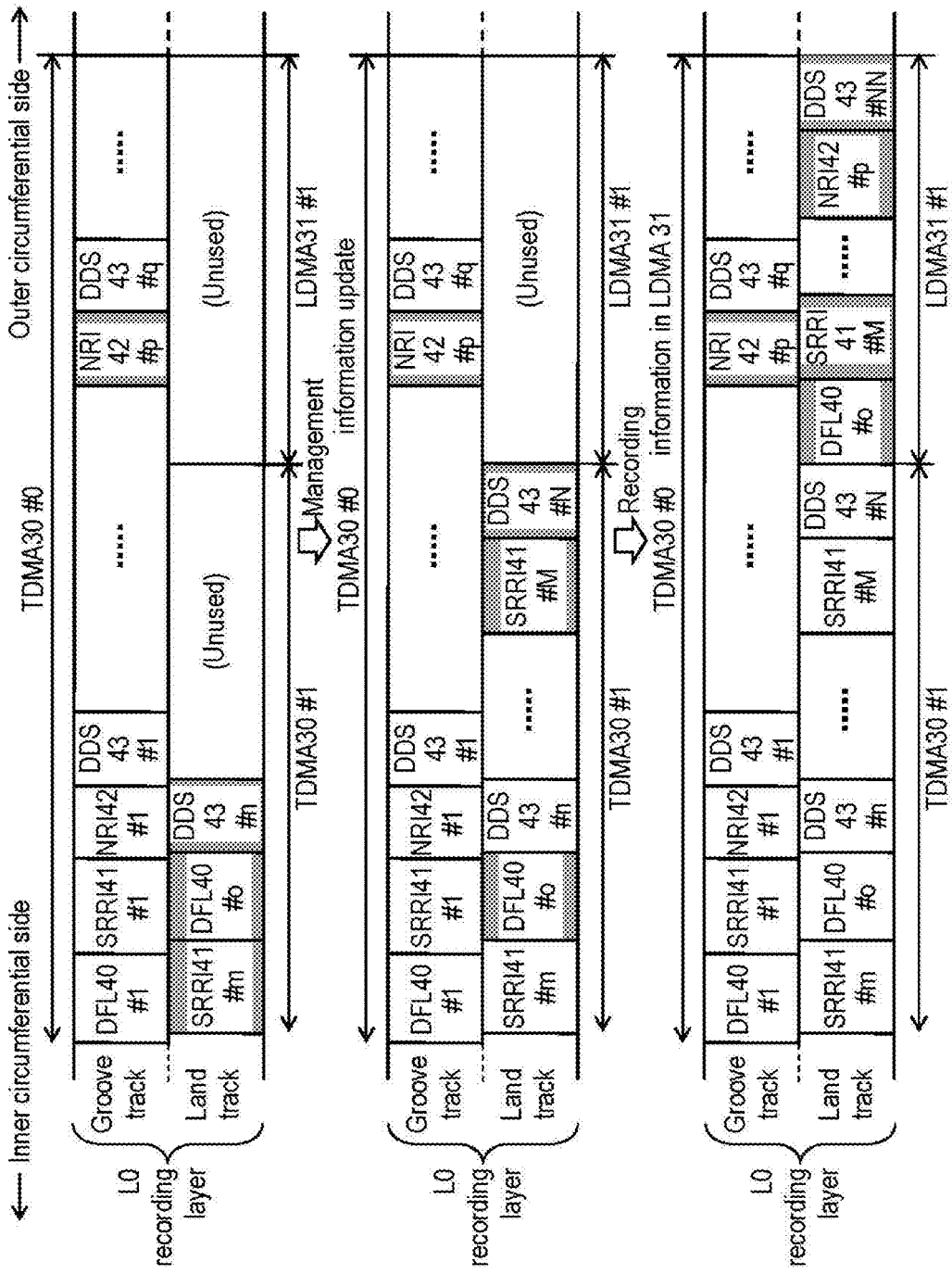
FIG. 7 is a view illustrating an example when management information is recorded in the DMA of the optical disc of the exemplary embodiment.

An actual use example of TDMA 30 and LDMA 31 of DMA 20 will be described below with reference to FIG. 7. FIG. 7 is a view illustrating an example when the management information is recorded in DMA 20 of the exemplary embodiment. TDMA 30 #0, TDMA 30 #1, and LDMA 31 #1 in the L0 recording layer are described in FIG. 7.

It is assumed that TDMA 30 is recorded as illustrated in an upper stage of FIG. 7. Latest DMS 50 includes the colored blocks, namely, DFL 40 #o, SRRI 41 #m, NRI 42 #p, and DDS 43 #n.

It is assumed that data is recorded in user data area 11 of optical disc 1. As illustrated in a middle stage of FIG. 7, SRRI 41 #M and DDS 43 #N are recorded from the next recordable position of TDMA 30. Latest DMS 50 includes the colored blocks, namely, DFL40 #o, SRRI 41 #M, NRI 42 #p, and DDS 43 #N.

At this point, all the areas of TDMA 30 #1 in the land track of the L0 recording layer are depleted as illustrated in the middle stage of FIG. 7. That is, TDMA 30 #0 and TDMA 30 #1 in the L0 recording layer are depleted. Latest DMS 50 is copied and recorded in LDMA 31 #1 of the L0 recording layer. At this point, because DDS 43 is position information in which the latest management information is recorded, DDS 43 is updated and recorded. Sometimes NRI 42 does not become copy record because the content is updated in the case that the non-recorded defect block is generated during the recording of LDMA 31. For DFL 40 and SRRI 41, the latest management information in TDMA 30 is always copied and recorded in LDMA 31. DDS 43 #NN in which DFL 40 #o, SRRI 41 #M, NRI 42 #p, and DDS 43 #N are updated is recorded in LDMA 31 #1 as illustrated in a bottom stage of FIG. 7.

In FIG. 7, the size of latest DMS 50 does not agree with the size of LDMA 31 during the recording in LDMA 31. Although the size of DFL 40 has about 16 blocks at the maximum, the size of DFL 40 is 1 block for a small number of alternation blocks such as the defect blocks. Therefore, frequently the size of DMS 50 is smaller than size of LDMA 31. In such cases, optical disc drive 200 can freely decide how to perform the recording in LDMA 31 as long as the following conditions (I) and (II) are satisfied.

[Condition]
(I) Latest DFL 40, latest SRRI 41, and latest NRI 42, which constitute latest DMS 50, are always recorded in LDMA 31.
(II) Latest DDS 43 is always recorded in the final block of LDMA 31.

For example, it is assumed that the size of latest DMS 50 is a total of 3 blocks in the case that the size of LDMA 31 is 18 blocks. 15 blocks except for 3 blocks necessary for the recording of DMS 50 may freely be used. For example, whole latest DMS 50 or any piece of management information may be recorded in the 15 blocks in a multiple manner, dummy data such as null data may be recorded in the 15 blocks, or the 15 blocks may be registered in NRI 42 as the non-recorded state.

In the case that the management information is recorded next to the bottom stage of FIG. 7, the recording is performed in TDMA 30 #2 of groove track in the L1 recording layer. Although the recording layer is changed, only the management information that needs to be updated may be recorded. For example, only SRRI 41 and DDS 43 may initially be recorded in TDMA 30 #2 of the L1 recording layer as the management information. Latest SRRI recording position information 438 indicating the position information about the L1 recording layer, latest DFL recording position information 437 indicating the position information about the L0 recording layer, and latest NRI recording position information 439 may be mixed as the position information about the management information about DDS 43.

Figure 8:
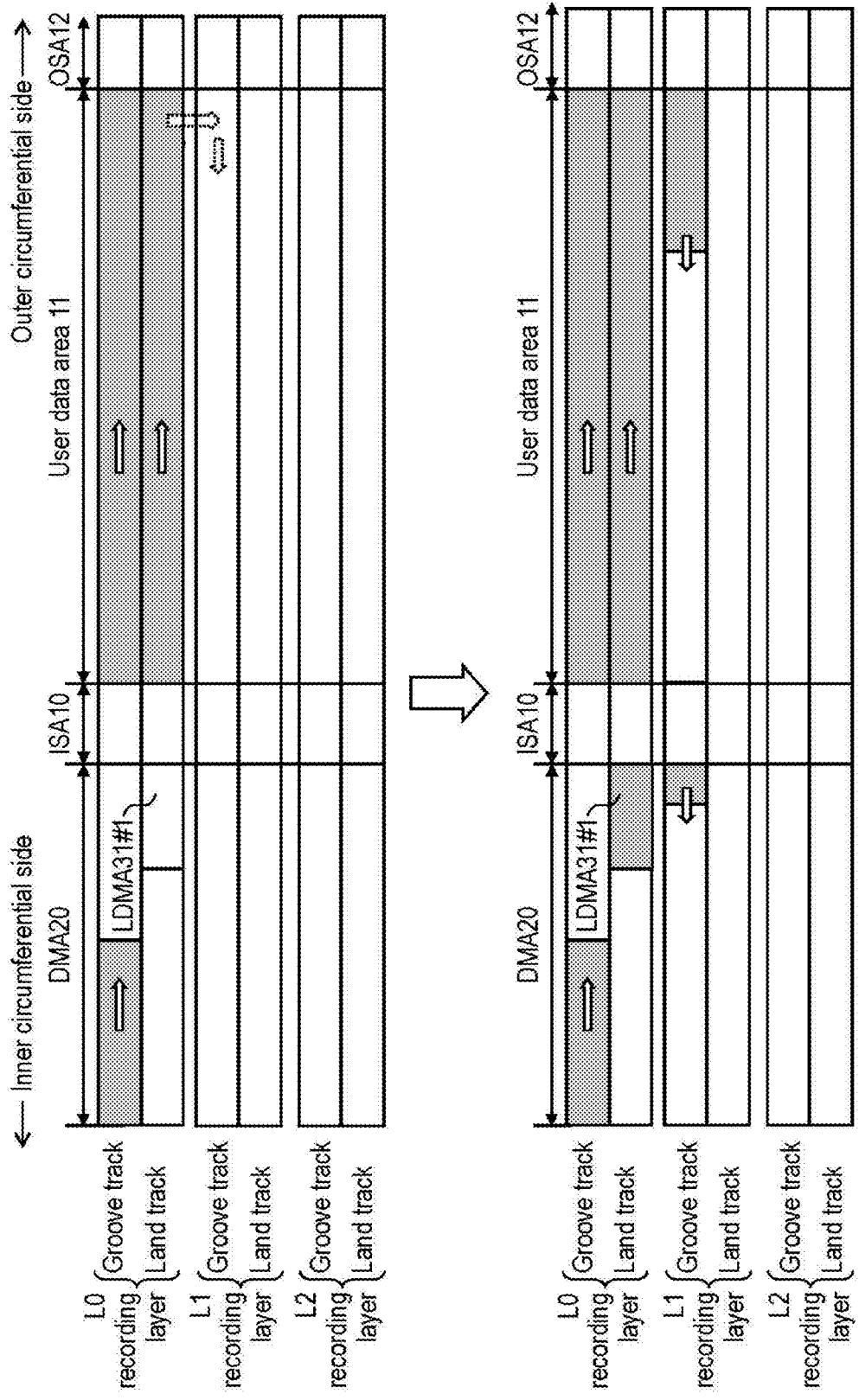
FIG. 8 is a view illustrating another example when the management information is recorded in the DMA of the optical disc of the exemplary embodiment.

Another use example of TDMA 30 and LDMA 31 of DMA 20 will be described below with reference to FIG. 8. FIG. 8 is a view illustrating another example when the management information is recorded in DMA 20 of optical disc 1 of the exemplary embodiment.

As described above, TDMAs 30 are sequentially used from TDMA 30 in the L0 recording layer at the deepest position with respect to the surface of optical disc 1. As long as TDMAs 30 are sequentially used from TDMA 30 in the L0 recording layer at the deepest position toward TDMA 30 in the L2 recording layer at the front position with respect to the surface of optical disc 1, TDMA 30 in the middle needs not to be used, or the use of next TDMA 30 may be started in the state in which TDMA 30 is partially used.

The user data is recorded in user data area 11. The user issues an instruction to perform the recording by the LBA accessible from the user. The logical block address is provided in the same order as an ascending order of the physical address. The leading position on the inner circumferential side of user data area 11 in the groove track or land track of the L0 recording layer is set to LBA0, and the LBA is consecutively provided from LBA0 toward the outer circumferential side. The LBA is provided in the order of the groove track to the land track, and provided in the order of the L0 recording layer, the L1 recording layer, and the L2 recording layer. That is, the LBA is provided to the user data area 11 in the order of the groove track of the L0 recording layer→the land track of the L0 recording layer→the groove track of the L1 recording layer→the land track of the L1 recording layer→the groove track of the L2 recording layer→the land track of the L2 recording layer.

In write-once type optical disc 1, the consecutive recording can be performed in the SRR. The SRR can be ensured from any position. Unless the SRR is ensured, the consecutive recording can be performed only from the position of LBA0. As illustrated in the top stage of FIG. 8, in recording the user data in optical disc 1, the case that the user data is recorded in user data area 11 of the L1 recording layer after recorded in user data area 11 of the L0 recording layer will be described below. At this point, in DAM 20, it is assumed that TDMA 30 #0 in the groove track of the L0 recording layer is currently used.

In the case that TDMA 30 is recorded from a write-once position of currently-used TDMA #0 while the user data is recorded in user data area 11 of the L1 recording layer, the optical disc drive performs the recording after performing recording adjustment such as the recording power and recording condition in each land track of the recording layer and in each groove track of the recording layer. Because the recording is performed in TDMAs 30 and user data areas 11 or different recording layers, namely, the L0 recording layer and the L1 recording layer, it is necessary for the optical disc drive to perform the recording adjustment before the recording in each recording layer.

In the case that the data is recorded in the L1 recording layer as illustrated in the bottom stage of FIG. 8, the recording is completed in DMA 20 of the L0 recording layer. Even if the management information recordable area remains in TDMA 30 #0 at the time point at which the recording is completed in user data area 11 of the L0 recording layer, latest DMS 50 is recorded in LDMA 31 #1 of the L0 recording layer. All the usable blocks of TDMA 30 #0 and all the blocks of TDMA 30 #1 are non-used; therefore, NRI 42 is updated with the pieces of information about these blocks as first non-recorded entry 422, and latest DMS 50 including updated NRI 42 is recorded in LDMA 31 #1. TDMA 30 in the L1 recording layer is used when the user data is recorded in user data area 11 of the L1 recording layer. Therefore, because both the user data and the management information are always recorded in the same recording layer, there is a merit of reducing the recording adjustment processing before the recording.

In this case, after the use of TDMA 30 #0 in the groove track of the L0 recording layer, TDMA 30 #1 in the land track of the L0 recording layer is not used but skipped, the recording is performed in LDMA 31 #1, and TDMA 30 #2 in the groove track of the L1 recording layer is used.

The timing of changing the recording layer is described in FIG. 8. In the case that the recording in user data area 11 is changed from the groove track to the land track in the same recording layer, TDMA 30 in the land track may be used even in the middle of TDMA 30 in the groove track. In this case, preferably LDMA 31 is disposed at not only the terminal position of DMA 20 in the land track but also the terminal position of DMA 20 in the groove track.

Figure 9:
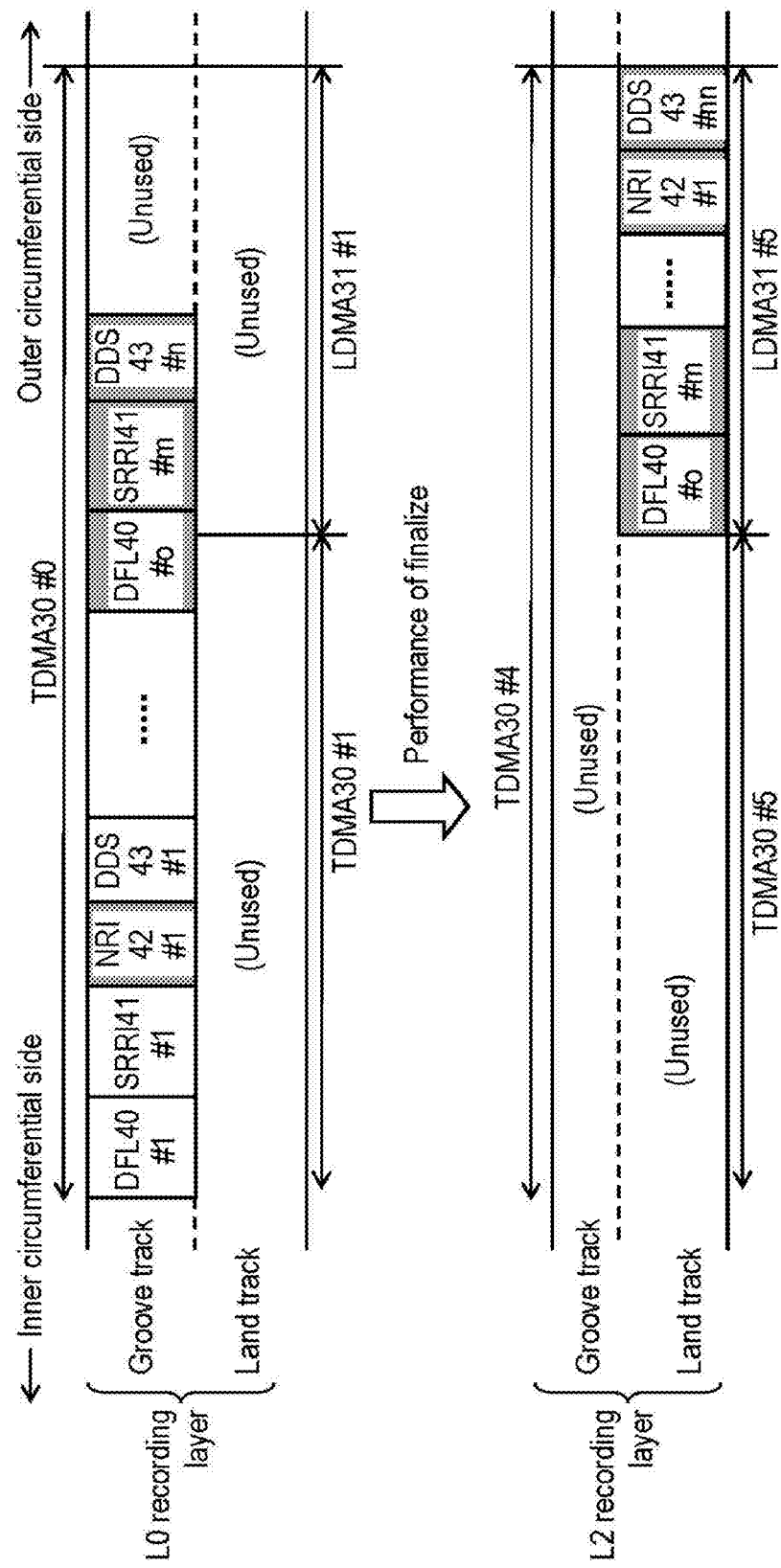
FIG. 9 is a view illustrating an example of the recording of the management information in the DMA when the optical disc of the exemplary embodiment is finalized.

FIG. 9 is a view illustrating an example of the recording of the management information in the DMA when the optical disc of the exemplary embodiment is finalized. The case that optical disc 1 is finalized when the recording in DMA 20 is performed in TDMA 30 #0 of the L0 recording layer will be described by way of example.

In the case that the recording position of TDMA 30 is the top stage of FIG. 9, latest DMS 50 includes the colored blocks, namely, DFL40 #o, SRRI 41 #m, NRI 42 #1, and DDS 43 #n. TDMA 30 #0 in the L0 recording layer is currently used, but the recording is not performed yet in LDMA 31#1 or the L1 recording layer.

At this point, in the case that a request to finalize optical disc 1 is made, latest DMS 50 in the L0 recording layer is copied to and recorded in LDMA 31#5 of the L2 recording layer in which final DMS 50 of whole optical disc 1 is recorded. However, DDS 43 is updated because DDS 43 includes the position information in which the latest management information is recorded, and DDS 43 is updated and recorded because recording prohibition state flag 440 is updated to a finalize state.

Sometimes NRI 42 does not become the copy recording because the content is possibly updated and recorded in the case that the non-recorded defect block is generated during the recording of LDMA 31 #5. Because the data is not recorded any more in the finalize state, even if the non-recorded defect block is generated during the recording of LDMA 31 #5, the latest information may directly be copied and recorded with respect to NRI 42.

For DFL 40 and SRRI 41, the latest management information in TDMA 30 is always copied to and recorded in LDMA 31 #5. DDS 43 #nn in which DFL 40 #o, SRRI 41 #M, NRI 42 #p, and DDS 43 #n are updated is recorded in LDMA 31 #5 as illustrated in a bottom stage of FIG. 9. Because latest DMS 50 is also recorded in TDMA30 #0 of the L0 recording layer, latest DMS 50 is recorded in at least two places, namely, TDMA 30 #0 and LDMA 31 #5.

Latest DMS 50 of TDMA 30 #0 may be put into the finalize state when LDMA 31 #5 is recorded as the finalize processing. Specifically, recording prohibition state flag 440 may be updated to the finalize state to record DDS 43 in a recording position next to TDMA 30 #0.

Figure 10:
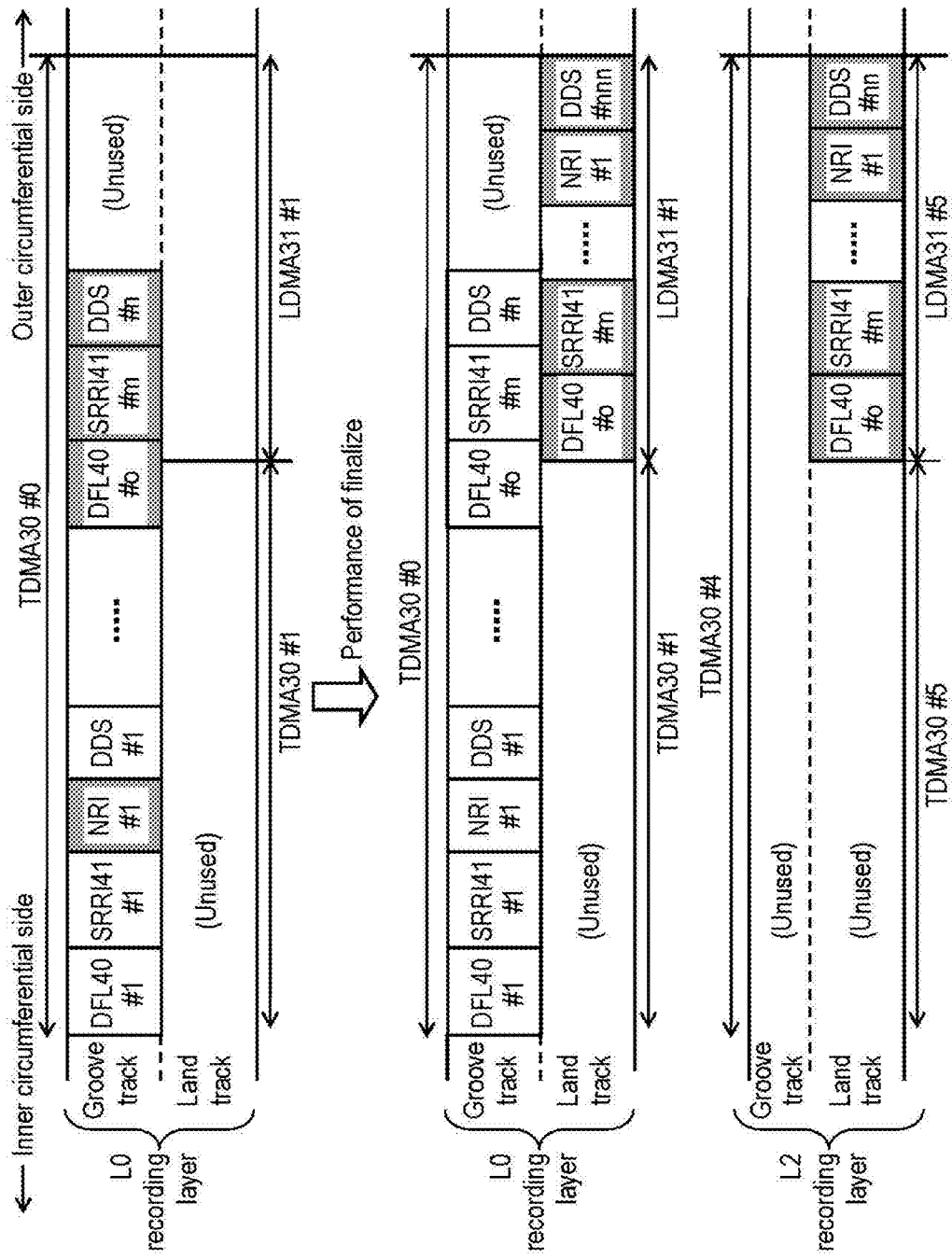
FIG. 10 is a view illustrating another example of the recording of the management information in the DMA when the optical disc of the exemplary embodiment is finalized.

At this point, the recording may be performed on LDMA 31 in the recording layer including currently-used TDMA 30 during the finalize. FIG. 10 is a view illustrating another example of the recording of the management information in the DMA when the optical disc of the exemplary embodiment is finalized. Not only latest DMS 50 is copied to and recorded in LDMA 31 #5 of the L2 recording layer as illustrated in the bottom stage of FIG. 10, but also latest DMS 50 is also copied to and recorded in LDMA 31 #1 of the L0 recording layer as illustrated in the middle stage of FIG. 10. DDS 43 #nnn in which DFL 40 #o, SRRI 41 #m, NRI 42 #1, and DDS 43 #n are updated is recorded in LDMA 31 #1.

Latest DMS 50 may be copied to and recorded in LDMA 31 #3 of the L1 recording layer. Thus, latest DMS 50 is multiple-recorded in the three places, so that the state of optical disc 1 can be recognized at high speed during activation while the reliability of the management information is improved.

(3) Configuration of Information Recording and Playback Device

An optical disc drive of the information recording and playback device that performs the recording and playback on optical disc 1 of the exemplary embodiment will be described below.

Figure 11:
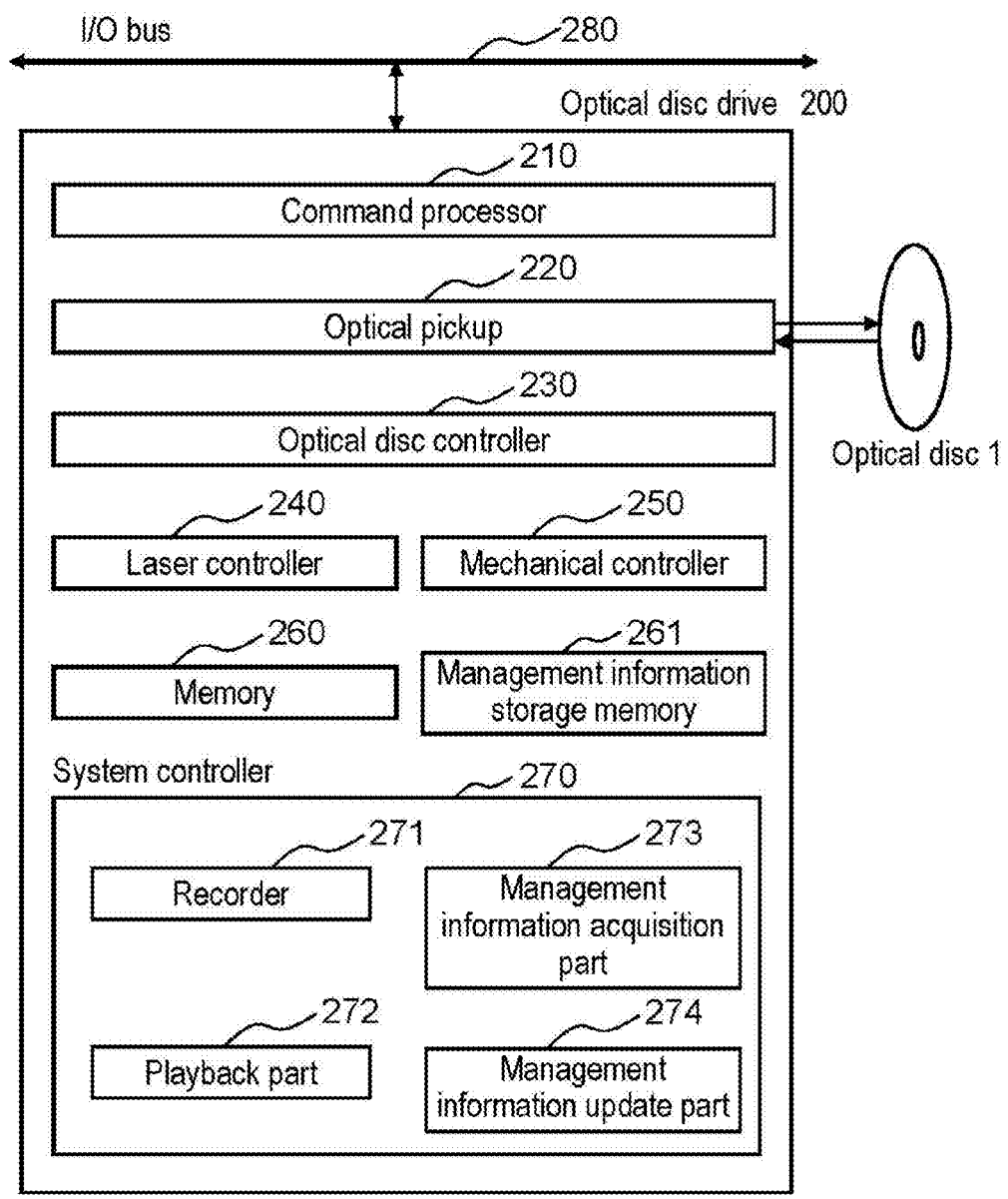
FIG. 11 is a block diagram illustrating an optical disc drive of the exemplary embodiment.

FIG. 11 is a block diagram illustrating optical disc drive 200 of the exemplary embodiment.

Optical disc drive 200 is connected to a high-order control device (not illustrated) through I/O bus 280. Examples of the high-order control device include a host computer and a controller.

Optical disc drive 200 includes command processor 210, optical pickup 220, optical disc controller 230, laser controller 240, mechanical controller 250, memory 260, management information storage memory 261, and system controller 270.

Command processor 210 processes various commands requested from the high-order control device. Optical pickup 220 irradiates optical disc 1 with the laser beam in order to perform the recording and playback. Optical disc controller 230 controls various signals and the access to optical disc 1, and performs the conversion between the physical address indicated by the wobble and the virtual physical address.

Laser controller 240 controls laser power output from optical pickup 220. Mechanical controller 250 moves optical pickup 220 to a target position, and performs the servo control. Memory 260 mainly manages the recorded and played-back user data and other pieces of information. Memory 260 is used as a buffer in which the data read from optical disc 1 and the data to be recorded are tentatively stored, and memory 260 is used to tentatively store various pieces of information necessary for the control of system controller 270. DDS 43, DFL 40, SRRI 41, and NRI 42, which are of the latest management information read from DMA 20, are stored in management information storage memory 261, and the management information to be recorded in DMA 20 is stored in management information storage memory 261. System controller 270 totally controls system processing such as the recording and playback processing performed on optical disc 1.

System controller 270 includes recording part 271 and playback part 272, which record and play back the user data or the data such as management information, management information acquisition part 273 that reads the management information mainly including latest DMS 50 recorded in DMA 20, and management information update part 274 that records latest DMS 50 in DMA 20.

(4) Recording Restriction of Optical Disc

As described above, there are some restrictions during the recording in optical disc 1 of the exemplary embodiment. The restrictions are briefly summarized.

Figure 16A:
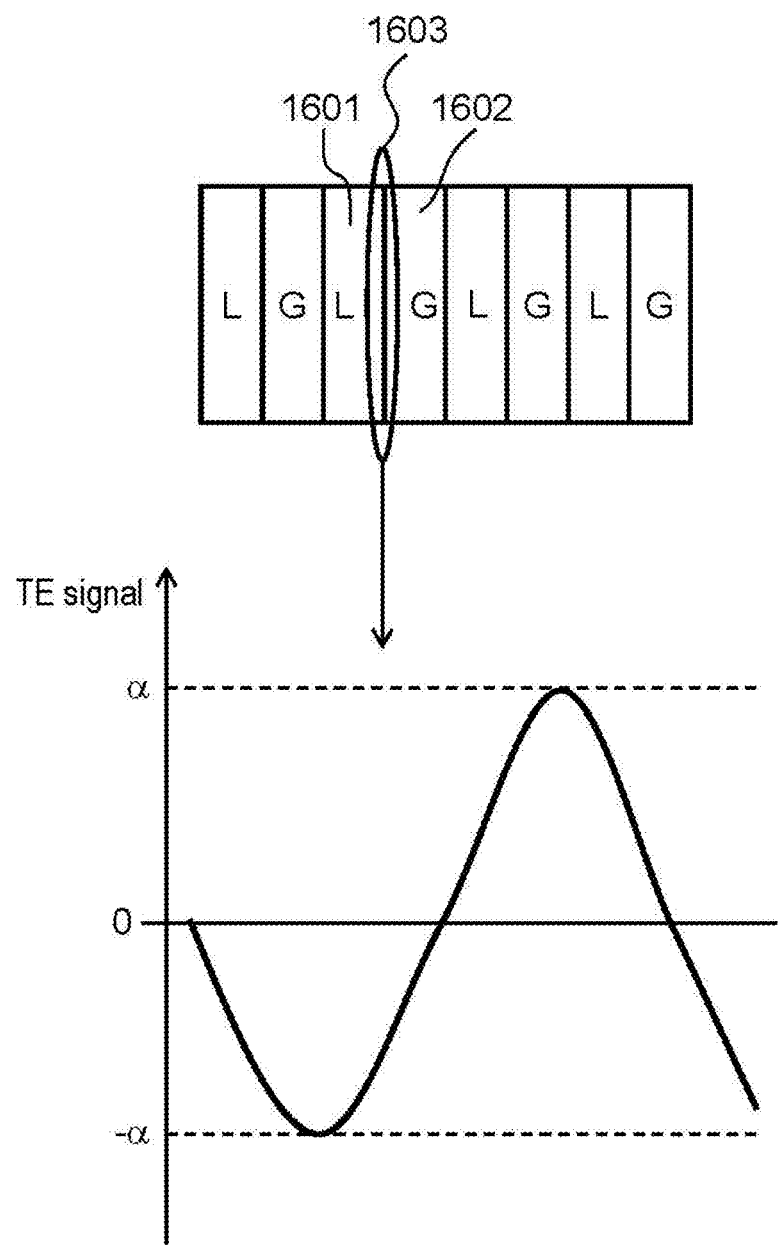
FIG. 16A is a view illustrating a change in offset amount of a TE signal at a non-recorded-non-recorded boundary position in performing trace control of the track when the recording is performed in a groove and a land of a conventional optical disc.

One of the restrictions is that "the recording is not performed on the recording target block unless tracks 2 adjacent to both the sides of the recording target block is in the uniform recording states" in order to solve the problem in FIGS. 16A and 16B. The term "tracks 2 adjacent to both the sides of the recording target block have the uniform recording states" means that "tracks 2 adjacent to both the sides of track 2 in which the recording target block exists are wholly recorded or non-recorded". In other words, in the case that tracks 2 adjacent to recording target track 2 are in the ununiform recording state, track 2 is not set to the recording target, but the alternation recording is performed on an alternation area included in ISA 10 or OSA 12 that is of the alternation recording spare area.

Even if the recording state of tracks 2 adjacent to both the sides of the recording target block varies, the data read, namely, the playback and the movement of optical pickup 220, namely, seek can be performed in optical disc drive 200.

In the second restriction, because optical disc 1 performs the land-groove recording while including the plurality of recording layers, optical disc 1 is largely influenced by the transmittance or reflectance change due to the difference between the recording states of the recording layers through which the light beam passes. Therefore, it is necessary to perform the data recording control in consideration of the second restriction. For example, in the case that the recording is performed on optical disc 1, the control is performed such that the recording state of the recording layer existing on the surface side of optical disc 1 with respect to the target recording layer becomes uniform, the control is performed such that the recording method is switched by a combination with the alternation recording according to the recording state of the recording layer on the surface side, or the control is performed such that the recording condition such as light beam irradiation power and a pulse emission condition is switched according to the recording state of the recording layer on the surface side.

(5) Latest Management Information Acquisition Processing

Figure 12:
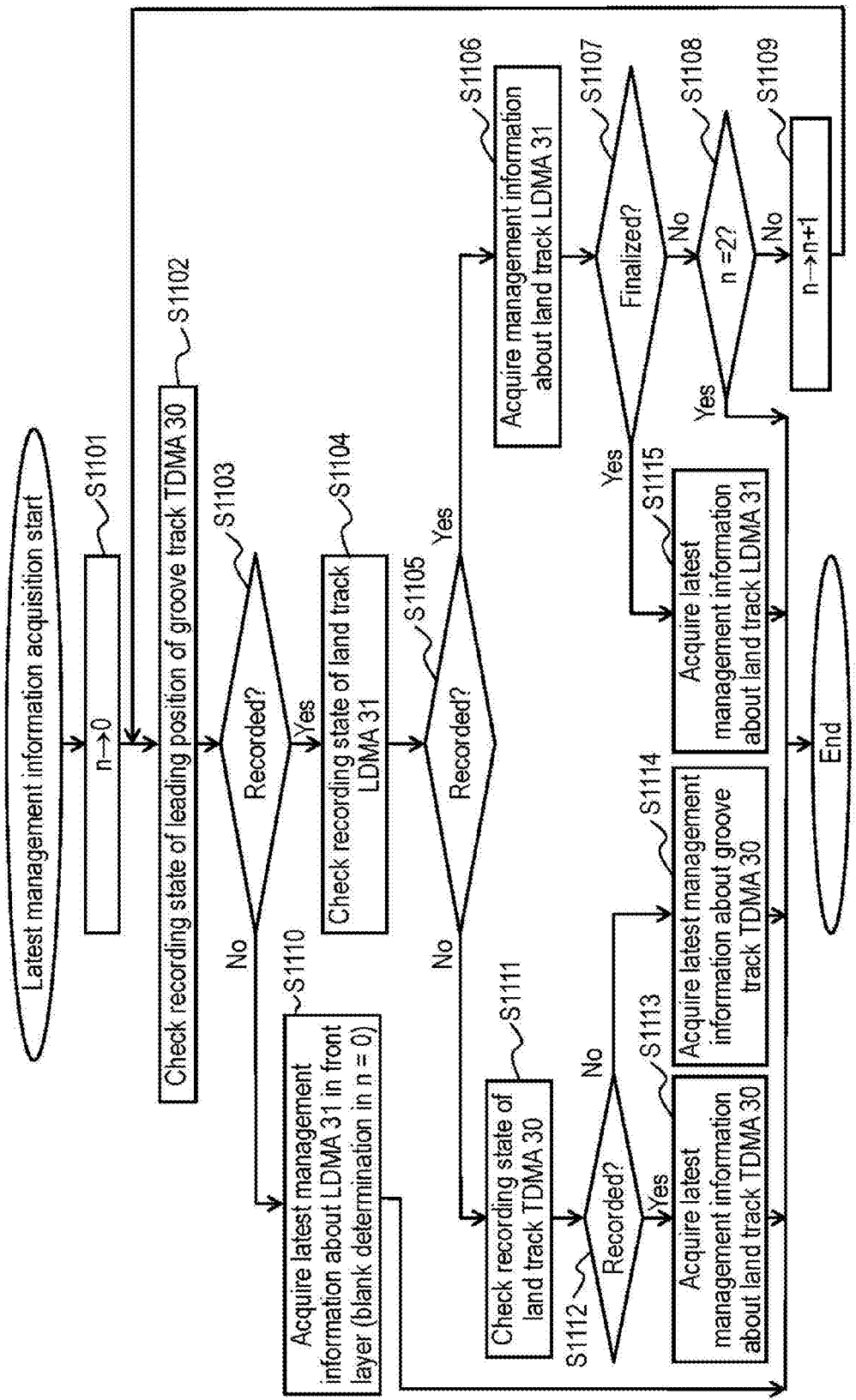
FIG. 12 is a flowchart illustrating a procedure to acquire latest management information from the DMA of the optical disc of the exemplary embodiment.

A procedure to acquire the management information constituting latest DMS 50 from optical disc 1 will be described below. FIG. 12 is a flowchart illustrating the procedure in which optical disc drive 200 acquires the latest management information from latest DMS 50 of optical disc 1. The procedure to acquire the latest management information from DMS 50 is generally performed while optical disc 1 is mounted on optical disc drive 200 to activate optical disc drive 200.

(Step S1101) Optical disc drive 200 sequentially searches the L0 recording layer, the L1 recording layer, and the L2 recording layer until acquiring the latest management information. First, target recording layer n is set to 0, namely, the target recording layer is set to the L0 recording layer.

(Step S1102) Optical disc drive 200 checks a recording state of a leading area of TDMA 30 in the groove track of the target recording layer. Specifically, system controller 270 of optical disc drive 200 issues an instruction to playback part 272 to play back the data in the leading area of TDMA 30 in the groove track of the target recording layer. Playback part 272 acquires playback data and a signal waveform in the playback using optical pickup 220.

At this point, optical disc drive 200 may check the recording state in the leading area of TDMA 30 in the land track of the target recording layer disposed at the same radial position.

(Step S1103) Optical disc drive 200 determines whether the leading area including the leading area of TDMA 30 in the groove track of the target recording layer is recorded. Specifically, playback part 272 of optical disc drive 200 determines whether the leading area of TDMA 30 in the groove track of the target recording layer is recorded from the playback data or signal waveform that is acquired in Step S1102. For example, optical disc drive 200 determines that the leading area of TDMA 30 is in the non-recorded state in the case that a playback amplitude signal is not obtained, and optical disc drive 200 determines that the leading area of TDMA 30 is recorded in the case that the playback amplitude signal is obtained to read effective data. In the case that the playback amplitude signal is obtained while the effective data is not read, for example, optical disc drive 200 may determine that the leading area of TDMA 30 is recorded when the adjacent block is recorded. The flow goes to Step S1104 when a determination result is "recorded" (Yes in Step S1103), and the flow goes to Step S1110 when the determination result is "non-recorded" (No in Step S1103).

(Step S1104) Management information acquisition part 273 confirms the layout position of LDMA 31 existing at the terminal position of the land track. For example, management information acquisition part 273 searches DDS 43 disposed at a predetermined position in the final sector from the data read from the leading block of TDMA 30 in the groove track. Management information acquisition part 273 acquires DMA size 435 and LDMA size 436 that are included in DDS 43. Initial DMS 50 including all the pieces of management information is always recorded in the leading block of TDMA 30 #0 of the groove track. Therefore, the layout position of LDMA 31 is confirmed.

Optical disc drive 200 checks the recording state of LDMA 31 in the land track of DMA 20 of the target recording layer. Specifically, system controller 270 of optical disc drive 200 issues an instruction to playback part 272 to play back the data of LDMA 31 existing at the terminal position of DMA 20 in the land track of the target recording layer. In LDMA 31, the data of the block including at least the final block may be played back, and the data of the leading block may further be played back, or all the pieces of data of LDMAs 31 in the 18 blocks may further be played back. Playback part 272 acquires the playback data and a signal waveform in the playback using optical pickup 220.

(Step S1105) Optical disc drive 200 determines whether LDMA 31 existing at the terminal position in the land track of DMA 20 of the target recording layer is recorded. Specifically, playback part 272 of optical disc drive 200 determines whether LDMA 31 in the land track of the target recording layer is recorded from the playback data or signal waveform that is acquired in Step S1104. For example, optical disc drive 200 determines that LDMA 31 is in the non-recorded state in the case that the playback amplitude signal is not obtained, and optical disc drive 200 determines that LDMA 31 is recorded in the case that the playback amplitude signal is obtained to read the effective data. At this point, because LDMA 31 has the 18-block size, optical disc drive 200 determines that LDMA 31 is recorded in the case that at least the leading block or final block of LDMA 31 in the 18 blocks is recorded. The flow goes to Step S1106 when the determination result is "recorded" (Yes in Step S1105), and the flow goes to Step S1111 when the determination result is "non-recorded" (No in Step S1105).

(Step S1106) Optical disc drive 200 acquires the management information included in LDMA 31 existing at the terminal position in the land track of DMA 20 of the target recording layer. Specifically, system controller 270 of optical disc drive 200 issues an instruction to playback part 272 to play back the data of the final block of LDMA 31 existing at the terminal position in the land track of DMA 20 of the target recording layer. Playback part 272 acquires the playback data using optical pickup 220, and the playback data is stored in, for example, memory 260. Then, system controller 270 acquires DDS 43 existing at the final sector position from the data of the final block of LDMA 31 stored in memory 260 using management information acquisition part 273, and stores DDS 43 in management information storage memory 261. Management information acquisition part 273 acquires latest DFL recording position information 437, latest SRRI recording position information 438, and latest NRI recording position information 439, which are included in DDS 43, acquires latest DFL 40, SRRI 41, and NRI 42 in the recording layer using playback part 272 and optical pickup 220, and stores latest DFL 40, SRRI 41, and NRI 42 in management information storage memory 261.

When the data cannot be acquired from the final block of LDMA 31, the data of another block in LDMA 31 is read to search DDS 43.

(Step S1107) Optical disc drive 200 determines whether optical disc 1 is finalized. Specifically, system controller 270 of optical disc drive 200 determines whether optical disc 1 is finalized from recording prohibition state flag 440 in DDS 43 stored in management information storage memory 261 in Step S1106. The flow goes to Step S1108 when the determination result is "non-recorded" (No in Step S1107), and the flow goes to Step S1115 when the determination result is "recorded" (Yes in Step S1107).

(Step S1108) Optical disc drive 200 determines whether target recording layer n is 2. The processing is ended when target recording layer n is 2 (Yes in Step S1108), and the flow goes to Step S1109 when target recording layer n is not 2 (No in Step S1108).

(Step S1109) Optical disc drive 200 sets target recording layer n to n+1.

(Step S1110) Optical disc drive 200 determines that DMS 50 included in LDMA 31 in the recording layer existing in front of the target recording layer is latest DMS 50 of optical disc 1. Specifically, system controller 270 of optical disc drive 200 acquires LDMA 31 in the land track of the recording layer existing in front of the target recording layer in Step S1106, and determines whether the management information stored in management information storage memory 261 is the management information constituting latest DMS 50.

At this point, in the case that n is 0, namely, the target recording layer is the L0 recording layer, optical disc 1 is determined to be a blank disc, namely, to be in the non-recorded state in which the data is not recorded at all. In this case, initial DMS 50 including DFL 40, SRRI 41, NRI 42, and DDS 43, which are in the initial state, is generated as latest DMS 50 in management information storage memory 261.

(Step S1111) Optical disc drive 200 checks the recording state of the leading area of TDMA 30 in the land track of the target recording layer. Specifically, system controller 270 of optical disc drive 200 issues the instruction to playback part 272 to play back the data in the leading area of TDMA 30 in the land track of the target recording layer. Playback part 272 acquires playback data and a signal waveform in the playback using optical pickup 220.

Step S1111 may be omitted in the case that optical disc drive 200 checks the recording state in the leading area of TDMA 30 in the land track of the target recording layer disposed at the same radial position in Step S1102.

(Step S1112) Optical disc drive 200 determines whether the leading area of TDMA 30 in the land track of DMA 20 of the target recording layer is recorded. Specifically, playback part 272 of optical disc drive 200 determines whether TDMA 30 in the land track of the target recording layer is recorded from the playback data or signal waveform that is acquired in Step S1111. For example, optical disc drive 200 determines that LDMA 31 is in the non-recorded state in the case that the playback amplitude signal is not obtained, and optical disc drive 200 determines that LDMA 31 is recorded in the case that the playback amplitude signal is obtained to read the effective data. The flow goes to Step S1113 when the determination result is "recorded" (Yes in Step S1112), and the flow goes to Step S1114 when the determination result is "non-recorded" (No in Step S1112).

(Step S1113) Optical disc drive 200 acquires the latest management information from TDMA 30 in the land track of the target recording layer. Specifically, system controller 270 of optical disc drive 200 searches the data of the block including latest DDS 43 from TDMA 30 in the land track of the target recording layer using playback part 272 and optical pickup 220, and acquires latest DDS 43 using management information acquisition part 273. Latest DDS 43 means DDS 43 that is disposed in (the final sector of) the recorded-area-side final block adjacent to the boundary between the recorded area and the non-recorded area in TDMA 30. A search method can be performed by performing a binary search. Management information acquisition part 273 stores latest DDS 43 obtained by the search in management information storage memory 261. Then, management information acquisition part 273 acquires latest DFL 40, SRRI 41, and NRI 42 from land-side or groove-side TDMA 30 in the recording layer based on latest DFL recording position information 437, latest SRRI recording position information 438, and latest NRI recording position information 439, which are included in latest DDS 43, and stores latest DFL 40, SRRI 41, and NRI 42 in management information storage memory 261. Therefore, all the pieces of management information constituting latest DMS 50 are acquired.

(Step S1114) Optical disc drive 200 acquires the latest management information from TDMA 30 in the groove track of the target recording layer. Specifically, system controller 270 of optical disc drive 200 searches the data of the block including latest DDS 43 from TDMA 30 in the groove track of the target recording layer using playback part 272 and optical pickup 220, and acquires latest DDS 43 using management information acquisition part 273. Latest DDS 43 means DDS 43 that is disposed in the final sector of the recorded-area-side final block adjacent to the boundary between the recorded area and the non-recorded area in TDMA 30. A search method can be performed by performing a binary search. Management information acquisition part 273 stores latest DDS 43 obtained by the search in management information storage memory 261.

Then, management information acquisition part 273 acquires latest DFL 40, SRRI 41, and NRI 42 from TDMA 30 in the recording layer based on latest DFL recording position information 437, latest SRRI recording position information 438, and latest NRI recording position information 439, which are included in latest DDS 43, and stores latest DFL 40, SRRI 41, and NRI 42 in management information storage memory 261. Therefore, all the pieces of management information constituting latest DMS 50 can be acquired.

(Step S1115) Optical disc drive 200 determines that DMS 50 included in LDMA 31 in the land track of the target recording layer is latest DMS 50 of optical disc 1. Specifically, system controller 270 of optical disc drive 200 determines that the management information, which is acquired in Step S1106 and stored in management information storage memory 261, is the management information constituting latest DMS 50.

Through the above steps, optical disc drive 200 performs the processing of acquiring the latest management information from optical disc 1.

Although not illustrated in the flowchart of FIG. 12, for n of 2, namely, in the case that LDMA 31 is determined to be recorded in Step S1105 in the processing performed on the L2 recording layer of the target recording layer, the determination that the finalize processing is performed is made at that time, the processing in Step S1107 is skipped after the processing in Step S1106, and the flow may go to Step S1115.

In the flowchart of FIG. 12, the processing in Step S1103 and the processing in Step S1104 may be reversed. That is, after the leading recording state of TDMA 30 in the target recording layer and the recording state at the terminal end of LDMA 31 are checked, the necessary search processing may be performed according to each recording state.

Figure 13:
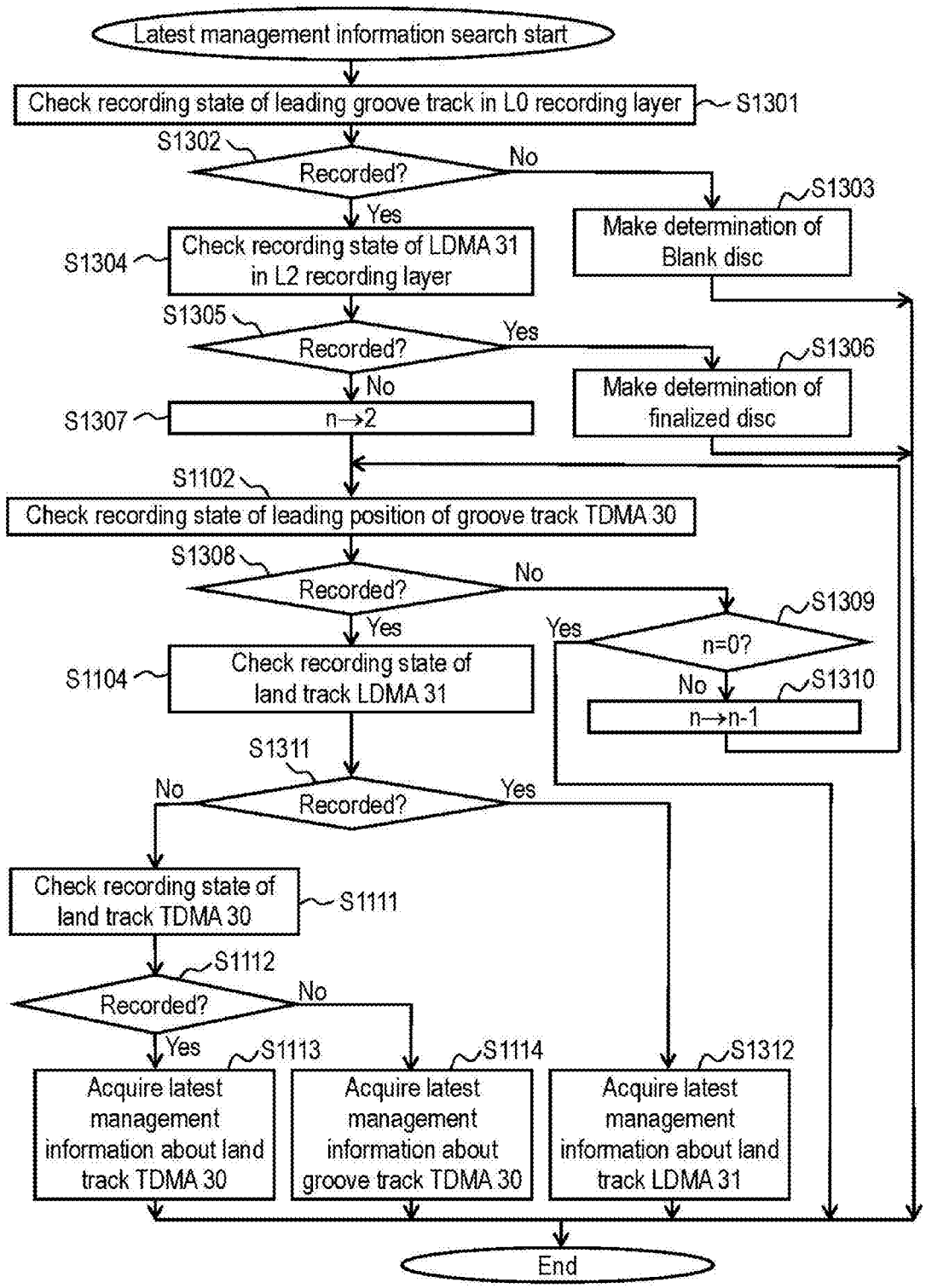
FIG. 13 is a flowchart illustrating another procedure to acquire the latest management information from the DMA of the optical disc of the exemplary embodiment.

The management information constituting latest DMS 50 from optical disc 1 can be acquired by another procedure. FIG. 13 is a flowchart illustrating another procedure to acquire the latest management information from latest DMA 50 of optical disc 1.

The processing in the same step as that in FIG. 12 is designated by the same reference mark, and the description is omitted.

(Step S1301) Optical disc drive 200 checks the recording state of the leading area of TDMA 30 #0 in the groove track of the L0 recording layer. Specifically, system controller 270 of optical disc drive 200 issues an instruction to playback part 272 to play back the data in the leading area of TDMA 30 #0 in the groove track of the L0 recording layer. Playback part 272 acquires the playback data and the signal waveform in the playback using optical pickup 220.

At this point, optical disc drive 200 may acquire the recording state in the leading area of TDMA 30 #1 in the land track of the L0 recording layer disposed at the same radial position together with the playback data and signal waveform.

(Step S1302) Optical disc drive 200 determines whether the leading area including the leading area of TDMA 30 in the groove track of the L0 recording layer is recorded. Specifically, playback part 272 of optical disc drive 200 determines whether the leading area of TDMA 30 #0 in the groove track of the L0 recording layer is recorded from the playback data or signal waveform that is acquired in Step S1301. Specifically, for example, optical disc drive 200 determines that the leading area of TDMA 30 #0 is in the non-recorded state in the case that the playback amplitude signal is not obtained, and optical disc drive 200 determines that the leading area of TDMA 30 #0 is recorded in the case that the playback amplitude signal is obtained to read the effective data. In the case that the playback amplitude signal is obtained while the effective data is not read, optical disc drive 200 may determine that the leading area of TDMA 30 #0 is recorded. The flow goes to Step S1304 when the determination result is "recorded" (Yes in Step S1302), and the flow goes to Step S1303 when the determination result is "non-recorded" (No in Step S1302).

(Step S1303) Optical disc drive 200 determined that loaded optical disc 1 is a blank disc. Specifically, system controller 270 of optical disc drive 200 determines that loaded optical disc 1 is the blank disc, namely, the non-recorded disc in which the data is not recorded at all. In this case, initial DMS 50 including DFL 40, SRRI 41, NRI 42, and DDS 43, which are in the initial state, is generated as latest DMS 50 in management information storage memory 261.

(Step S1304) Optical disc drive 200 checks the recording state of LDMA 31 #5 existing at the terminal position in the land track of DMA 20 of the L2 recording layer. Specifically, system controller 270 of optical disc drive 200 issues the instruction to playback part 272 to play back the data of LDMA 31 #5 existing at the terminal position of DMA 20 in the land track of the L2 recording layer. In LDMA 31 #5, the data of the block including at least the final block may be played back, and the data of the leading block may further be played back, or all the pieces of data of LDMAs 31 #5 (for example, 18 blocks) may further be played back. Playback part 272 acquires the playback data and the signal waveform in the playback using optical pickup 220.

At this point, optical disc drive 200 may acquire the recording state in the terminal area of TDMA 30 #4 in the groove track of the L2 recording layer disposed at the same radial position together with the playback data and signal waveform.

(Step S1305) Optical disc drive 200 determines whether LDMA 31 #5 existing at the terminal position in the land track of DMA 20 of the L2 recording layer is recorded. Specifically, playback part 272 of optical disc drive 200 determines whether LDMA 31 #5 in the land track of the L2 recording layer is recorded from the playback data or signal waveform that is acquired in Step S1304. Specifically, for example, optical disc drive 200 determines that the leading area of TDMA 30 #5 is in the non-recorded state in the case that the playback amplitude signal is not obtained, and optical disc drive 200 determines that the leading area of TDMA 30 #5 is recorded in the case that the playback amplitude signal is obtained to read the effective data. At this point, for example, because LDMA 31 #5 has the 18-block size, optical disc drive 200 determines that LDMA 31 #5 is recorded in the case that at least the leading block or final block of LDMA 31 #5 in the 18 blocks is recorded. The flow goes to Step S1306 when the determination result is "non-recorded" (No in Step S1305), and the flow goes to Step S1307 when the determination result is "recorded" (Yes in Step S1305).

(Step S1306) Optical disc drive 200 determines that optical disc 1 is the finalized disc, and acquires the latest management information from LDMA 31 #5. Specifically, system controller 270 of optical disc drive 200 plays back the data of the final block of LDMA 31 #5 existing at the terminal position of DMA 20 in the land track of the L2 recording layer using playback part 272 and optical pickup 220, and stores the played-back data in, for example, memory 260. Optical disc drive 200 acquires DDS 43 existing at the final sector position in the played-back data using management information acquisition part 273, and stores DDS 43 in management information storage memory 261. Management information acquisition part 273 acquires latest DFL recording position information 437, latest SRRI recording position information 438, and latest NRI recording position information 439, which are included in DDS 43, acquires latest DFL 40, SRRI 41, and NRI 42 in the recording layer using playback part 272 and optical pickup 220, and stores latest DFL 40, SRRI 41, and NRI 42 in management information storage memory 261. When the data cannot be acquired from the final block of LDMA 31, the data of another block in LDMA 31 #5 is read to search DDS 43.

(Step S1307) Optical disc drive 200 sequentially searches the L2 recording layer, the L1 recording layer, and the L0 recording layer until acquiring the latest management information. First, target recording layer n is set to 2, namely, the target recording layer is set to the L2 recording layer.

(Step S1308) Optical disc drive 200 determines whether the leading area including the leading area of TDMA 30 in the groove track of the target recording layer is recorded. Specifically, playback part 272 of optical disc drive 200 determines whether the leading area of TDMA 30 in the groove track of the target recording layer is recorded from the playback data or signal waveform that is acquired in Step S1102. For example, optical disc drive 200 determines that the leading area of TDMA 30 is in the non-recorded state in the case that a playback amplitude signal is not obtained, and optical disc drive 200 determines that the leading area of TDMA 30 is recorded in the case that the playback amplitude signal is obtained to read effective data. In the case that the playback amplitude signal is obtained while the effective data is not read, for example, optical disc drive 200 may determine that the leading area of TDMA 30 is recorded when the adjacent block is recorded. The flow goes to Step S1104 when the determination result is "recorded" (Yes in Step S1308), and the flow goes to Step S1309 when the determination result is "non-recorded" (No in Step S1308).

(Step S1309) Optical disc drive 200 determines whether target recording layer n is 0. The processing is ended when target recording layer n is 0 (Yes in Step S1309), and the flow goes to Step S1310 when target recording layer n is not 0 (No in Step S1309).

When n is determined to be 0 in Step S1309, optical disk 1 is determined to be the blank disc in Steps S1302 and S1303, and the processing in Step S1309 is improbable processing. Therefore, the processing in Step S1309 is not necessarily performed. The processing in Step S1309 is described just in case that n becomes 0 for any reason.

(Step S1310) Optical disc drive 200 sets target recording layer n to n−1.

(Step S1311) Optical disc drive 200 determines whether LDMA 31 existing at the terminal position in the land track of DMA 20 of the target recording layer is recorded. Specifically, playback part 272 of optical disc drive 200 determines whether LDMA 31 in the land track of the target recording layer is recorded from the playback data or signal waveform that is acquired in Step S1104. For example, optical disc drive 200 determines that LDMA 31 is in the non-recorded state in the case that the playback amplitude signal is not obtained, and optical disc drive 200 determines that LDMA 31 is recorded in the case that the playback amplitude signal is obtained to read the effective data. At this point, because LDMA 31 has the 18-block size, optical disc drive 200 determines that LDMA 31 is recorded in the case that at least the leading block or final block of LDMA 31 in the 18 blocks is recorded. The flow goes to Step S1312 when the determination result is "recorded" (Yes in Step S1311), and the flow goes to Step S1111 when the determination result is "non-recorded" (No in Step S1311).

(Step S1312) Optical disc drive 200 acquires the management information included in LDMA 31 existing at the terminal position in the land track of DMA 20 of the target recording layer. Specifically, system controller 270 of optical disc drive 200 issues an instruction to playback part 272 to play back the data of the final block of LDMA 31 existing at the terminal position in the land track of DMA 20 of the target recording layer. Playback part 272 acquires the playback data using optical pickup 220, and the playback data is stored in, for example, memory 260. Then, system controller 270 acquires DDS 43 existing at the final sector position from the data of the final block of LDMA 31 stored in memory 260 using management information acquisition part 273, and stores DDS 43 in management information storage memory 261. Management information acquisition part 273 acquires latest DFL recording position information 437, latest SRRI recording position information 438, and latest NRI recording position information 439, which are included in DDS 43, and acquires latest DFL 40, SRRI 41, and NRI 42 in the recording layer using playback part 272 and optical pickup 220.

When the data cannot be acquired from the final block of LDMA 31, the data of another block in LDMA 31 is read to search DDS 43.

Through the above steps, optical disc drive 200 performs the processing of acquiring the latest management information from optical disc 1.

(6) Latest Management Information Recording Processing

Figure 14:
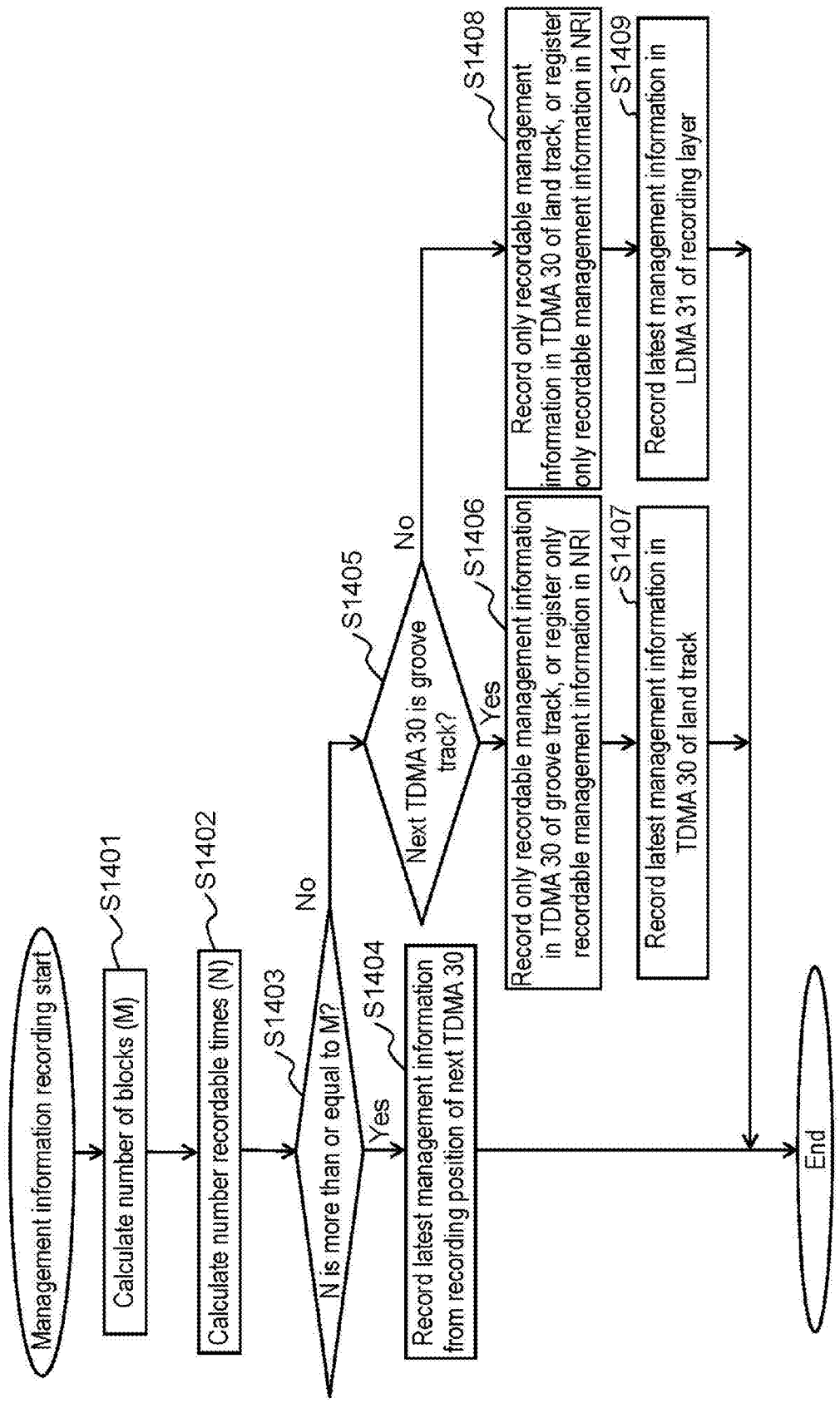
FIG. 14 is a flowchart illustrating a procedure to record the latest management information in the DMA of the optical disc of the exemplary embodiment.

Processing of recording the new management information in DMA 20 of optical disc 1 will be described below. FIG. 14 is a flowchart illustrating a procedure to record the latest management information in DMA 20 of the optical disc of the exemplary embodiment. It is assumed that the management information needs to be updated such that, before the processing in FIG. 14 is performed, the user data is recorded in user data area 11 or the consecutive recording area called the SRR is newly ensured. The description is made on the assumption that optical disc drive 200 already recognizes the position of DMA 20, in which the next management information is recorded, through the latest management information acquisition processing. Hereinafter, next usable TDMA 30 including the write-once position is referred to as next recording TDMA 30.

(Step S1401) Optical disc drive 200 calculates the number of blocks M (M is a positive number of 1 or more) necessary for the recording from the management information to be recorded. Specifically, management information update part 274 in system controller 270 of optical disc drive 200 updates the management information stored in management information storage memory 261 such that the management information becomes the latest state in association with the change of the recording state such as the recording of the user data.

Management information update part 274 calculates the size of the updated management information that needs to be recorded as latest DMS 50 in DMA 20. Specifically, for example, it is assumed that the user data is recorded, that the defect block is detected at that point, and that the alternation recording is performed on ISA 10 or OSA 12 of the spare area.

In this case, SRRI 41 and DFL 40 are updated. Assuming that the size of updated DFL 40 is 1 block and 30 sectors (62 sectors), and that the size of SRRI 41 is 2 sectors, a total of 3 blocks is calculated as the number of blocks necessary for the recording of the management information because DDS 43 needs to be also recorded. At this point, the management information (in this case, NRI 42), which needs not to be recorded because the content is not updated, may also be recorded.

For example, in the case that the size of NRI 42 is 1 sector, the total of blocks of recording target DFL 40, SRRI 41, DDS 43, and NRI 42 becomes 3 blocks, and the number of blocks used in the recording does not change. In such cases, the management information that is not updated may be recorded from the viewpoint of improvement of redundancy.

A value to which a margin is added may be used as the number of blocks M necessary for the recording in consideration of a recording failure caused by a local defect of optical disc 1.

(Step S1402) Optical disc drive 200 calculates the number of remaining blocks N (N is a positive number of 0 or more) that can consecutively be recorded in next recording TDMA 30. Specifically, system controller 270 of optical disc drive 200 calculates the number of usable blocks based on the position of next recording TDMA 30 in which the next management information can be recorded, and the size of DMA 20 or the size of LDAM 31. For example, in the case that next recording TDMA 30 is groove-side TDMA 30 #0 in the L0 recording layer, the area from the write-once position where the next recording is performed to the block at the terminal position (that is, the front side of ISA 10 #0 that is of the spare area) of TDMA 30 #0 is the usable block in which the new management information is consecutively recorded.

(Step S1403) Optical disc drive 200 determines whether the management information to be recorded can directly be recorded in next recording TDMA 30. Specifically, using the number of blocks M necessary for the update of the management information calculated in Step S1401 and the number of consecutively recordable blocks N of the next recording TDMA 30 calculated in Step S1402, system controller 270 of optical disc drive 200 determines whether N is greater than or equal to M.

When N is greater than or equal to M, the management information to be recorded can collectively be recorded in next recording TDMA 30. When N is less than M, the management information to be recorded cannot be recorded only in next recording TDMA 30, namely, the management information to be recorded needs to be also recorded in another TDMA 30 or across LDMA 31. The flow goes to Step S1404 when the determination result is "N is greater than or equal to M" (Yes in Step S1403), and the flow goes to Step S1405 when the determination result is "N is less than M" (No in Step S1403).

(Step S1404) Optical disc drive 200 records the latest management information in next recording TDMA 30. Specifically, system controller 270 of optical disc drive 200 makes a request to recording part 271 to record the recording target management information, which is updated by management information update part 274 and stored in management information storage memory 261, from the write-once position of next recording TDMA 30 calculated in Step S1403. Recording part 271 records the latest management information from the write-once position of next recording TDMA 30 of optical disc 1 through optical pickup 220.

For example, in the case that next recording TDMA 30 is TDMA 30 #0, that the number of blocks M of the management information to be recorded is 3 blocks, and that the number of remaining recordable blocks N of TDMA 30 #0 is 10 blocks, recording part 271 records the new updated management information in TDMA 30 #0. The management information to be recorded is the management information in which the content is updated. At the same time, the management information in which the content is not updated may be recorded.

(Step S1405) Optical disc drive 200 determines whether next recording TDMA 30 is TDMA 30 of the groove-side track. Specifically, system controller 270 of optical disc drive 200 determines that next recording TDMA 30 is TDMA 30 in the groove track when next recording TDMA 30 is TDMA 30 #0, TDMA 30 #2, or TDMA 30 #4. Otherwise, system controller 270 determines that next recording TDMA 30 is TDMA 30 in the land track. The flow goes to Step S1406 when the determination result is "groove track" (Yes in Step S1405), and the flow goes to Step S1408 when the determination result is "land track" (No in Step S1405).

(Step S1406) Optical disc drive 200 records only the recordable management information in the groove-side TDMA 30 of next recording TDMA 30, or registers only the recordable management information in NRI 42 as the unused cluster. Specifically, system controller 270 of optical disc drive 200 adopts one of the following methods because the area size is not enough to record the whole management information in next recording TDMA 30 in the groove track.

In the first method, only the management information recordable in the number of remaining recordable blocks of next recording TDMA 30 is recorded. For example, in the case that the number of remaining recordable blocks N is 2, because size M of the management information to be recorded is a total of 3 blocks, namely, DFL 40 of 62 sector (1 block and 30 sectors), SRRI 41 of 2 sectors, and DDS 43 of 1 sector, the management information to be recorded cannot collectively be recorded. However, for example, a combination of DFL 40 and DDS 43 can be recorded.

Therefore, the flow goes to Step S1407 after only the recordable management information is recorded in the remaining recordable block. In this case, system controller 270 of optical disc drive 200 makes a request to recording part 271 to record a part (for example, DFL 40 and DDS 43) of the recording target management information, which is updated by management information update part 274 and stored in management information storage memory 261, from the write-once position of next recording TDMA 30. Recording part 271 records a part of the latest management information from the write-once position of next recording TDMA 30 of optical disc 1 through optical pickup 220. In Step S1407, a combination of SRRI 41 and DDS 43 is recorded in DM S50.

In the second method, the remaining recordable block is skipped and registered in NRI 42 as the unused block, and the flow goes to Step S1407. That is, in the case that the number of remaining recordable blocks does not satisfy the management information to be recorded, the remaining recordable blocks are discarded and maintained in the non-recorded state, and the management information to be recorded is collectively recorded in newly usable TDMA 30.

Although the area of TDMA 30 looks wasted, DMS 50 of the latest management information is collectively disposed in new TDMA 30. Therefore, there is a merit that the time necessary for the latest management information acquisition processing can be shortened, namely, the activation time of optical disc 1 can be shortened. In this case, for example, management information update part 274 of system controller 270 additionally resisters first non-recorded entry 422, in which the new write-once position of next recording TDMA 30 is set to first non-recorded block position information 423 while the number of remaining recordable blocks is set to consecutive block number information 424, in NRI 42 stored in management information storage memory 261.

Even if the first method is used, sometimes the area size is not enough to record the whole management information to be recorded, and the block in the area remains unused (usable). In such cases, the processing may be performed by a combination of the first and second methods.

(Step S1407) Optical disc drive 200 records the latest management information in next usable TDMA, namely, TDMA in the land track of the same recording layer. Specifically, system controller 270 of optical disc drive 200 records DMS 50, which is constructed with the latest management information while not recorded in Step S1406, in next usable TDMA 30. Because next recording TDMA 30 is groove-side TDMA 30 in Step S1406, next usable TDMA 30 becomes TDMA 30 in the land track of the same recording layer. For example, in the case that next recording TDMA 30 is TDMA 30 #0 in the L0 recording layer in Step S1406, next usable TDMA 30 becomes TDMA 30 #1 in the land track of the same L0 recording layer.

System controller 270 of optical disc drive 200 makes a request to recording part 271 to record the recording target management information, which is updated by management information update part 274 and stored in management information storage memory 261, from the leading position of TDMA 30 in the land track. Recording part 271 records the latest management information from the leading block position of land-side TDMA 30 through optical pickup 220.

(Step S1408) Optical disc drive 200 records only the recordable management information in the land-side TDMA 30 of next recording TDMA 30, or registers the land-side TDMA 30 to NRI 42 as the unused cluster. Specifically, system controller 270 of optical disc drive 200 performs the processing similar to that in Step S1406 because the area size is not enough to record the whole management information in next recording TDMA 30 in the land track. Because the content of the processing is identical to that in Step S1406 except that next recording TDMA 30 is TDMA 30 in the land track and that the step performed after the completion of the processing is Step S1409, the detailed description is omitted.

(Step S1409) Optical disc drive 200 records the latest management information in LDMA 31. Specifically, optical disc drive 200 records the whole latest management information in the recording layer in LDMA 31, which is used in the recording in Step S1408 or exists adjacent to skipped land-side TDMA 30. In Step S1409, the whole management information including the management information that is not updated is recorded. Because the LDMA has the area size enough to record the whole management information, it is not necessary to consider the number of blocks necessary for the update in Step S1403 and the number of consecutively recordable blocks. Specifically, system controller 270 of optical disc drive 200 records DMS 50, which includes the whole latest management information including the management information that is not recorded in Step S1408, in LDMA 31. System controller 270 of optical disc drive 200 makes a request to recording part 271 to record the whole management information stored in management information storage memory 261 from the leading position of land-side LDMA 31. Recording part 271 records the latest management information from the leading block position of TDMA 30 in the land track through optical pickup 220. Frequently LDMA 31 has the size enough for the management information to be recorded. For example, in the case that the total number of recording blocks of the whole management information is 3 blocks, LDMA 31 has the size of 18 blocks, and 15 blocks remain. In such cases, it is necessary to perform the recording such that DDS 43 is recorded in the final sector of the final block of LDMA 31. Therefore, for example, in order to increase the redundancy, the whole management information having the 3-block size may repeatedly be recorded six times. Alternatively, after the whole management information having the 3-block size is recorded, the management information including DDS 43 may repeatedly be recorded in the remaining block. Alternatively, after the whole management information is recorded in the first 3 blocks, the remaining area before the final block is resistered to first non-recorded entry 422 of NRI 42 as the unused block (usable block), and DMS 50 which is combination of updated NRI 42 and DDS 43 is recorded in the final block.

After the recording is performed on LDMA 31 in Step S1409, the same management information as that recorded in LDMA 31 may further be recorded in groove-side TDMA 30 of next usable TDMA 30 in the next recording layer.

Through the above steps, optical disc drive 200 performs the processing of recording the latest management information in optical disc 1.

Although the detailed description is omitted, in the case that the management information is recorded in TDMA 30 or LDMA 31, management information update part 274 updates the stored in management information storage memory 261 such that the information (specifically, latest DFL recording position information 437, latest SRRI recording position information 438, and latest NRI recording position information 438) in DDS 43 indicating the recording position of the management information indicates the position where the last target management information is recorded, thereby recording updated DDS 43.

(7) Finalize Processing

Figure 15:
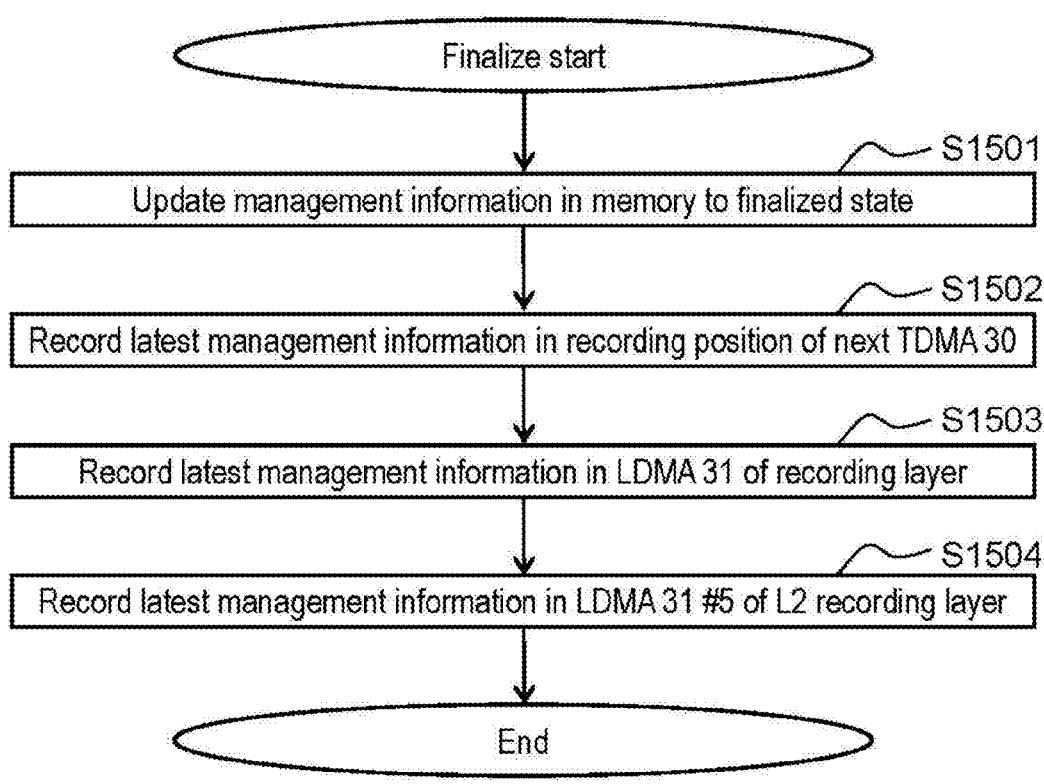
FIG. 15 is a flowchart illustrating a procedure to finalize the optical disc of the exemplary embodiment.

Finally, processing of finalizing optical disc 1 will be described. FIG. 15 is a flowchart illustrating a procedure to finalize optical disc 1 of the exemplary embodiment. Hereinafter, next usable TDMA 30 including the write-once position is referred to as next recording TDMA 30.

(Step S1501) Optical disc drive 200 changes the management information to the finalized state. Specifically, system controller 270 of optical disc drive 200 updates recording prohibition state flag 440 of DDS 43 in the latest management information stored in management information storage memory 261 such that recording prohibition state flag 440 indicates the finalized state. For example, in the case that DDS 43 includes the position information indicating the next recordable position in ISA 10 or OSA 12 of the spare area, the position information may be updated to the state (in hexadecimal number, All 0xFF or All 0x00) indicating that the next recording cannot be performed in finalized state.

(Step S1502) Optical disc drive 200 records the latest management information in next recording TDMA 30. Specifically, system controller 270 of optical disc drive 200 makes a request to recording part 271 to record the recording target management information, which is stored in management information storage memory 261 while including DDS 43 updated to the finalized state by management information update part 274, or the whole management information from the write-once position of next recording TDMA 30.

Recording part 271 records the latest management information from the write-once position of next recording TDMA 30 of optical disc 1 through optical pickup 220. For example, recording part 271 records the latest management information in TDMA 30 #0 in the case that next recording TDMA 30 is TDMA 30 #0. Although not described, in the case that the number of blocks of the management information to be recorded is larger than the number of remaining recordable blocks of next recording TDMA 30, the management information is recorded in TDMA 30 in which the whole management information can be recorded as illustrated in FIG. 14.

In the case that next recording TDMA 30 is TDMA 30 #4 or TDMA 30 #5, which is of TDMA 30 in the L2 recording layer, Step S1503 is skipped, and the flow goes to Step S1504.

(Step S1503) Optical disc drive 200 records the latest management information in LDMA 31 of the same recording layer as next recording TDMA 30. Because the processing in Step S1503 is basically identical to the processing in Step S1409, the detailed description is omitted. As described above, the processing in Step S1503 is skipped in the case that next recording TDMA 30 is TDMA 30 in the L2 recording layer.

(Step S1504) Optical disc drive 200 records the latest management information in LDMA 31 #5 of the L2 recording layer. Because the processing in Step S1504 is basically identical to the processing in Step S1409 similarly to Step S1503, the detailed description is omitted.

Optical disc drive 200 performs the processing of finalizing optical disc 1 through the above steps.

The processing in Step S1503 in FIG. 15 is not necessarily performed, but may be omitted.

Although the detailed description is omitted, in the case that the management information is recorded in TDMA 30 or LDMA 31, management information update part 274 updates the stored in management information storage memory 261 such that the information (specifically, latest DFL recording position information 437, latest SRRI recording position information 438, and latest NRI recording position information 438) in DDS 43 indicating the recording position of the management information indicates the position where the last target management information is recorded, thereby recording updated DDS 43.

Optical disc 1 of the exemplary embodiment is described as the write-once type optical disc including at least one recording layer. Alternatively, for example, optical disc 1 may be a double-sided disc in which the recording layers are disposed on both the surfaces.

In the exemplary embodiment, by way of example, LDMA 31 is disposed in each recording layer, and disposed at the terminal position of the land-side track. Alternatively, for example, LDMA 31 may be disposed in each of the land track and the groove track. That is, the same advantage can be obtained even if LDMA 31 is disposed in each of the land track and the groove track of all the recording layers.

In the exemplary embodiment, DFL 40, SRRI 41, NRI 42, and DDS 43 are included as the management information constituting DMS 50. At this point, another piece of management information may be included. In the case that another piece of management information is included, preferably DDS 43 newly includes information indicating a latest management information layout position.

What is claimed is:

1. A write-once type information recording medium comprising at least two recording layers,
    wherein each of the at least two recording layers has a spiral shape in which a land track and a groove track are alternately arranged as a recording track, the recording track is divided into blocks each of which being a minimum unit in which recording is performed,
    each of the at least two recording layers includes (i) a disc management area, where management information is recorded and a user data area where user data is recorded, on the land track and (ii) another disc management area and another user data area on the groove track, and
    the disc management areas of both the land track and the groove track of the at least two recording layers are disposed at a same distance from the center of the information recording medium.

2. The information recording medium according to claim 1, wherein the disc management areas are sequentially used starting from the disc management area on a recording layer which is farthest from a surface of the information recording medium to the disc management area on a recording layer which is closest to the surface of the information recording medium.

3. The information recording medium according to claim 2, wherein the disc management areas on each recording layer of the at least two recording layers are used starting from a first track, which is a predetermined one of the groove track and the land track, to a second track, which is the other one of the groove track and the land track.

4. The information recording medium according to claim 3, wherein the disc management areas on each of the at least two recording layers include a temporary disc management area where the management information is temporarily recorded and a confirmed disc management area where the management information is confirmedly recorded, and
    in each of the at least two recording layers, the confirmed disc management area is disposed at a predetermined position in the disc management area on the second track.

5. The information recording medium according to claim 4, wherein, during finalize processing in which additional recording is prohibited, the latest management information is recorded in the confirmed disc management area on the recording layer closest to the surface of the recording medium.

6. The information recording medium according to claim 1, wherein the management information includes a recording prohibition state flag indicating whether finalize processing has been performed, and
    during the finalize processing, the recording prohibition state flag is recorded so as to indicate that the finalize processing has been performed.

7. An information recording method for recording information on a write-once type information recording medium including at least two recording layers,
    wherein each of the at least two recording layers has a spiral shape in which a land track and a groove track are alternately arranged as a recording track, the recording track being divided into blocks each of which being a minimum unit in which recording is performed,
    the information recording medium includes disc management areas where management information is recorded and a user data area where user data is recorded,
    each of the disc management areas of both the land track and the groove track on each recording layer of the at least two recording layers is disposed at a same distance from the center of the information recording medium, and
    the at least two recording layers are sequentially used starting from a position farthest from a surface of the information recording medium to a position closest to the surface of the information recording medium.

8. The information recording method according to claim 7, wherein the disc management areas on each of the at least two recording layers include a temporary disc management area where the management information is temporarily recorded and a confirmed disc management area where the management information is confirmedly recorded,
    in each of the at least two recording layers, the confirmed disc management area is disposed at a predetermined position in the disc management area of the recording track used in one of the land track and the groove track, and
    in each recording layer of the at least two recording layers, the latest management information is recorded in the confirmed disc management area after being recorded in the temporary disc management area.

9. The information recording method according to claim 8, wherein, in performing finalize processing in which additional recording is prohibited, the latest management information is recorded in the confirmed disc management area on the recording layer closest to the surface of the recording medium.

10. The information recording method according to claim 7, wherein the management information includes a recording prohibition state flag indicating whether finalize processing has been performed, and
    in performing the finalize processing, the recording prohibition state flag is recorded so as to indicate that the finalize processing has been performed.

11. An information recording device that records information on a write-once type information recording medium including at least two recording layers,
    the at least two recording layers of the information recording medium having a spiral shape in which a land track and a groove track are alternately arranged as a recording track, the recording track being divided into blocks each of which being a minimum unit in which recording is performed,
    the information recording medium including disc management areas where management information is recorded and a user data area where user data is recorded,
    each of the disc management areas of both the land track and the groove track on each recording layer of the at least two recording layers is disposed at a same distance from the center of the information, the information recording device comprising:
an optical pickup that irradiates the information recording medium with a laser beam;
a mechanical controller that controls the optical pickup; and
a recording part that controls the recording of the management information and the user data,
wherein the recording part controls the recording of the management information in the disc management area such that the recording is sequentially performed starting from a position farthest from a surface of the information recording medium to a position closest to the surface of the information recording medium with respect to the at least two recording layers.

12. The information recording device according to claim 11, wherein the disc management areas on each of the at least two recording layers include a temporary disc management area where the management information is temporarily recorded and a confirmed disc management area where the management information is confirmedly recorded,
in each of the at least two recording layers, the confirmed disc management area is disposed at a predetermined position in the disc management area of the recording track used in one of the land track and the groove track, and
in the at least two recording layers, the recording part performs control such that the latest management information is recorded in the confirmed disc management area after being recorded in the temporary disc management area.

13. The information recording device according to claim 12, wherein, in performing finalize processing in which additional recording is prohibited, on the information recording medium, the recording part performs control such that the latest management information is recorded in the confirmed disc management area closest to the surface of the recording medium.

14. The information recording device according to claim 13, wherein the management information includes a recording prohibition state flag indicating whether the finalize processing has been performed, and
in performing the finalize processing on the information recording medium, the recording part controls the recording of the management information such that the recording prohibition state flag of the management information indicates that the finalize processing has been performed.

15. An information playback method for playing back information from a write-once type information recording medium including at least two recording layers,
wherein each of the at least two recording layers has a spiral shape in which a land track and a groove track are alternately arranged as a recording track, the recording track is divided into blocks each of which being a minimum unit in which recording is performed,
the information recording medium includes disc management areas where management information is recorded and a user data area where user data is recorded,
each of the disc management areas of the land track and the groove track on each recording layer of the at least two recording layers is disposed at a same distance from the center of the information recording medium,
a boundary between a recorded disc management area and a non-recorded disc management area is sequentially searched staring from a position farthest from a surface of the information recording medium to a position closest to the surface of the information recording medium, and the latest management information is acquired from the recorded disc management area adjacent to the boundary.

16. The information playback method according to claim 15, wherein the disc management areas on each of the at least two recording layers include a temporary disc management area where the management information is temporarily recorded and a confirmed disc management area where the management information is confirmedly recorded,
in each of the at least two recording layers, the confirmed disc management area is disposed at a predetermined position in the disc management area of the recording track used in one of the land track and the groove track, and
it is determined that finalize processing in which additional recording is prohibited has been performed, when the latest management information is recorded in the confirmed disc management area.

17. The information playback method according to claim 15, wherein the management information includes a recording prohibition state flag indicating whether the finalize processing has been performed, and
whether finalize processing is performed has been determined using the recording prohibition state flag included in the latest management information acquired from the disc management area.

18. An information playback device that plays back information from a write-once type information recording medium including at least two recording layers,
the at least two recording layers of the information recording medium having a spiral shape in which a land track and a groove track are alternately arranged as a recording track, the recording track being divided into blocks each of which being a minimum unit in which recording is performed,
the information recording medium including disc management areas where management information is recorded and a user data area where user data is recorded,
each of the disc management areas of both the land track and the groove track on each recording layer of the at least two recording layers being disposed at a same distance from the center of the information recording medium,
the information playback device comprising:
an optical pickup that irradiates the information recording medium with a laser beam;
a mechanical controller that controls the optical pickup; and
a playback part that controls the playback of the management information and the user data,
wherein the playback part controls the playback of the management information such that a boundary between a recorded disc management area and a non-recorded disc management area is sequentially searched starting from a position farthest from a surface of the information recording medium to a position closest to the surface of the information recording medium, and such that the latest management information is acquired from the recorded disc management area adjacent to the boundary.

19. The information playback device according to claim 18, wherein the disc management areas on each of the at least two recording layers include a temporary disc management area where the management information is temporarily recorded and a confirmed disc management area where the management information is confirmedly recorded, in each of the at least two recording layers, the confirmed disc management area is disposed at a predetermined position in the disc management area of the recording track used later in one of the land track and the groove track, and the playback part performs control so as to determine that finalize processing in which additional recording is prohibited has been performed, when the latest management information is recorded in the confirmed disc management area.

20. The information playback device according to claim 18, wherein the management information includes a recording prohibition state flag indicating whether finalize processing has been performed, and the playback part performs control so as to determine whether the finalize processing has been performed using the recording prohibition state flag included in the latest management information acquired from the disc management area.

21. The information recording medium according to claim 2, wherein the disc management area on a recording layer is usable, remaining a usable block of the disc management area on another recording layer.

* * * * *